US011312366B2

(12) United States Patent
Yang

(10) Patent No.: US 11,312,366 B2
(45) Date of Patent: Apr. 26, 2022

(54) METHOD FOR REINFORCING VEHICLE SAFETY ON RAMP AND VEHICLE THEREOF

(71) Applicants: HYUNDAI MOTOR COMPANY, Seoul (KR); KIA MOTORS CORPORATION, Seoul (KR)

(72) Inventor: Dae-Sung Yang, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 72 days.

(21) Appl. No.: 17/073,878

(22) Filed: Oct. 19, 2020

(65) Prior Publication Data

US 2021/0370913 A1 Dec. 2, 2021

(30) Foreign Application Priority Data

Jun. 2, 2020 (KR) ........................ 10-2020-0066394

(51) Int. Cl.
*B60W 30/02* (2012.01)
*B60Q 9/00* (2006.01)
(Continued)

(52) U.S. Cl.
CPC ............... *B60W 30/02* (2013.01); *B60Q 1/50* (2013.01); *B60Q 9/00* (2013.01); *B60W 10/04* (2013.01); *B60W 10/11* (2013.01); *B60W 10/18* (2013.01); *B60W 30/18009* (2013.01); *B60W 40/076* (2013.01); *B60W 50/0205* (2013.01);
(Continued)

(58) Field of Classification Search
None
See application file for complete search history.

(56) References Cited

U.S. PATENT DOCUMENTS 8,328,690 B2 * 12/2012 Ohtsu ................... B60W 10/06
477/185
9,849,884 B2 * 12/2017 Kim ................ B60W 30/18027
(Continued)

FOREIGN PATENT DOCUMENTS

CN 104903624 A * 9/2015 ............... B60K 6/48
CN 108839648 A * 11/2018 ............. B60K 17/00
(Continued)

*Primary Examiner* — Dirk Wright
(74) *Attorney, Agent, or Firm* — McDonnell Boehnen Hulbert & Berghoff LLP

(57) ABSTRACT

A method for reinforcing safety of a vehicle on a ramp applied to a vehicle is performed by a first priority anti-skid countermeasure control in which a brake is operated together with displaying an occurrence of the skid of a vehicle/vehicle stop message on a ramp by a controller when the vehicle starts, a second priority anti-skid countermeasure control in which compensating an idle torque is performed together with displaying a guidance of anti-skid function operation/vehicle stop message is performed, a third priority anti-skid countermeasure control in which displaying a turn-off/vehicle stop message is performed, and a fourth priority anti-skid countermeasure control in which forcibly shifting to a N (neutral) stage or permitting the shift together with displaying a forcibly switching to the shift stage N stage/vehicle stop message is performed.

20 Claims, 14 Drawing Sheets

(51) Int. Cl.
   *B60Q 1/50*    (2006.01)
   *B60W 30/18*   (2012.01)
   *B60W 50/14*   (2020.01)
   *B60W 10/18*   (2012.01)
   *B60W 10/04*   (2006.01)
   *B60W 50/02*   (2012.01)
   *G07C 5/08*    (2006.01)
   *B60W 40/076*  (2012.01)
   *B60W 10/11*   (2012.01)

(52) U.S. Cl.
   CPC ........... *B60W 50/14* (2013.01); *G07C 5/0808* (2013.01); *B60W 2520/10* (2013.01); *B60W 2540/12* (2013.01)

(56) References Cited

U.S. PATENT DOCUMENTS

| | | | |
|---|---|---|---|
| 10,065,616 B2 * | 9/2018 | Toole | B60T 8/4863 |
| 2016/0311437 A1 * | 10/2016 | Tabuchi | B60W 30/18118 |
| 2017/0166210 A1 | 6/2017 | Kim | |

FOREIGN PATENT DOCUMENTS

| | | | | |
|---|---|---|---|---|
| DE | 102016206730 A1 * | 10/2017 | | |
| DE | 102018118155 A1 * | 1/2019 | | B60K 6/48 |
| KR | 2012-0137659 A | 12/2012 | | |
| KR | 10-1298820 B1 | 8/2013 | | |
| KR | 101487841 B1 * | 1/2015 | | |
| KR | 20150060314 A * | 6/2015 | | |
| KR | 20160066602 A * | 6/2016 | | |
| KR | 2017-0068052 A | 6/2017 | | |
| WO | WO-2018173291 A1 * | 9/2018 | | B60W 30/18118 |

* cited by examiner

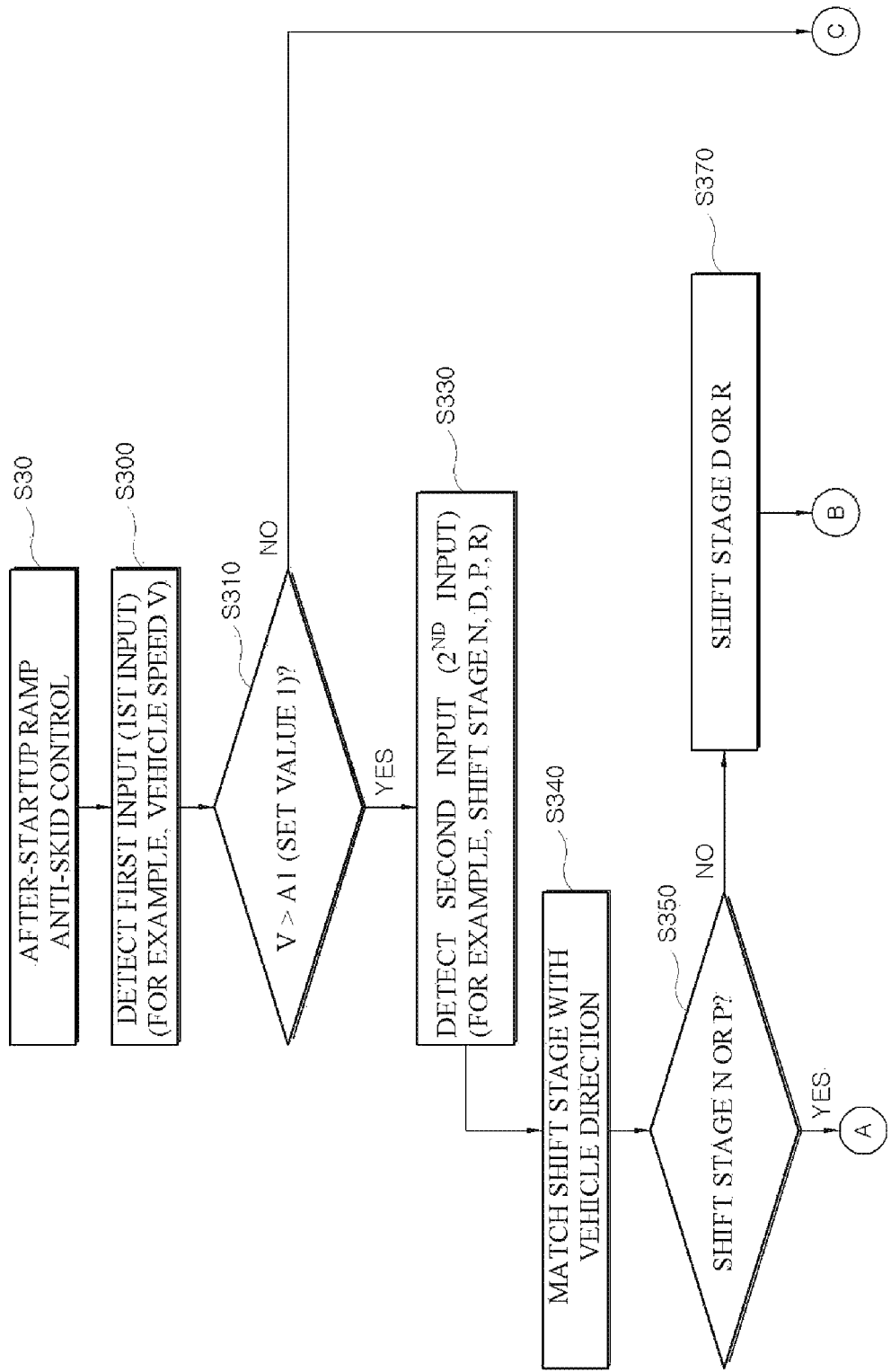

METHOD FOR REINFORCING VEHICLE SAFETY ON RAMP AND VEHICLE THEREOF

CROSS REFERENCE TO RELATED APPLICATIONS

This application claims priority to Korean Patent Application No. 10-2020-0066394, filed on Jun. 2, 2020, which is incorporated herein by reference in its entirety.

BACKGROUND

Field

The present disclosure relates to a method for reinforcing safety of a vehicle on a ramp, and more particularly, to a vehicle which implements logic for reinforcing the safety of the vehicle on the ramp, which may prevent a vehicle from skidding and being turned off when the vehicle starts on a reverse steep slope without applying an electrical parking brake (EPB).

Description of Related Art

Generally, an electrical parking brake (EPB)-applied vehicle prevents the vehicle from skidding on a ramp due to inexperienced driving of a general driver who is not familiar with an operation of a clutch when the vehicle starts on the ramp, and prevents an engine from being turned off due to the occurrence of the skid of the vehicle on the ramp.

Such an EPB belongs to an apparatus which is difficult to universally mount to the vehicle due to an increase in the vehicle cost compared to providing a safety function of the vehicle, due to the characteristics of an electronic braking system which requires a separate apparatus such as an actuator, a cable, or a parking mechanism.

Accordingly, most vehicles use powertrain (PT)-based vehicle anti-skid logic using the PT, thereby preventing the engine from being turned off due to the skid of the vehicle together with securing a braking force even without the assistance of the EPB when the vehicle starts to move after being parked/stopped on the ramp.

As an example, the PT-based vehicle anti-skid logic prevents the vehicle from skidding on the ramp, and particularly, the reverse ramp, which results in loss of the braking force due to the turn-off of the vehicle when the vehicle starts to move on the ramp under an engine side torque control through the weight of fuel of the parked/stopped vehicle on the ramp.

However, the PT-based vehicle anti-skid logic is a manner which does not classify an engine stall condition (or a PT stall condition) and a vehicle skid condition due to a reverse slope gradient or a current transmission input stage characteristics, thereby having a limitation in that the logic is not easily applied to the vehicle actually.

Particularly, the PT-based vehicle anti-skid logic simply performs a torque control due to the weight of fuel, and also has difficulty in sufficiently exerting the vehicle anti-skid effect on the reverse ramp due to the above manner.

Furthermore, the PT-based vehicle anti-skid logic has no specified fuel weight limit, such that the PT durability management and risk management functions are not necessarily sufficient.

The contents described in Description of Related Art are to help the understanding of the background of the present disclosure, and may include what is not previously known to those skilled in the art to which the present disclosure pertains.

SUMMARY

An object of the present disclosure considering the above point is to provide a method for reinforcing safety of a vehicle on a ramp and a vehicle thereof, which may prevent the vehicle from skidding and being turned off when the vehicle starts on a reverse steep ramp without applying an EPB to largely reinforce the effectiveness of PT-based vehicle anti-skid logic against the startup on the ramp, and particularly, to reinforce simplicity of performing a torque control due to the weight of fuel by classifying an engine stall condition and a transmission input stage, thereby protecting durability of the vehicle and at the same time, securing the safety of a passenger through the user notification about a vehicle skid condition while increasing the possibility of being actually applied to the vehicle.

A method for reinforcing safety of a vehicle on a ramp according to the present disclosure for achieving the object includes confirming a vehicle gradient calculation value when an engine of a vehicle starts by a controller, confirming an after-startup gradient vehicle movement condition which classifies a shift stage N stage or P stage located regardless of a vehicle direction based on a vehicle speed sensor at a predetermined vehicle speed as a ramp first management condition, and classifies a shift stage D stage or R stage located opposite to the vehicle direction based on the vehicle speed sensor at a certain vehicle speed as a ramp second management condition, and an anti-skid countermeasure control which varies a driver's recognition for the skid of the vehicle by setting, as a message rating, any one of generating a notification message, generating an attention message, generating a caution message, and generating a warning message, and selects an operation of a brake of the vehicle, compensating an idle torque, and forcibly shifting to the N stage according to the message rating.

As an exemplary embodiment, the anti-skid countermeasure control includes a first priority anti-skid countermeasure control in which the generating the notification message is performed in the ramp first management condition, and induces a driver to operate the brake so that the brake is operated after the notification message is generated. The generating of the notification message includes the displaying the occurrence of the skid of the vehicle/vehicle stop message and the turning-on the warning lamp.

As an exemplary embodiment, the first priority anti-skid countermeasure control includes the generating of the notification message in the ramp first management condition, confirming the operation of the brake with a brake pedal signal, and terminating the generating of the notification message by operating the brake.

As an exemplary embodiment, the anti-skid countermeasure control includes a second priority anti-skid countermeasure control in which a torque intervention condition of the idle torque by a primary vehicle speed condition is confirmed in the ramp second management condition, performs the generating of the attention message, and notifies the driver that the idle torque compensation is performed through the generating the attention message. The generating of the attention message is performed by displaying the guidance of the anti-skid function operation/vehicle stop message and turning on the warning lamp.

As an exemplary embodiment, the second priority anti-skid countermeasure control includes confirming a detected vehicle speed as a primary vehicle speed condition by detecting a vehicle speed, performing an idle torque compensation control with one or more of the vehicle speed, a gradient, a shift stage, the vehicle direction based on the vehicle sensor, and an engine stall, performing the generating of the attention message, confirming a vehicle gradient calculation value again, and performing the confirming of the after-startup gradient vehicle movement condition again when the vehicle speed reaches a target vehicle speed by the driving of the vehicle or switching to the forcibly shifting to the N stage when not reaching the target vehicle speed.

As an exemplary embodiment, the vehicle speed satisfies the primary vehicle speed condition when existing between a ramp skid lower limit vehicle speed threshold and a ramp skid upper limit vehicle speed threshold.

As an exemplary embodiment, the idle torque compensation control includes: confirming idle torque compensation necessity which classifies a torque intervention condition and a torque non-intervention condition with one or more of the vehicle speed, the gradient, and the shift stage, determining the necessity for an OBD diagnostic condition in the torque intervention condition, compensating the shift stage-based torque after confirming the non-occurrence of the engine stall when an OBD diagnosis is not needed, and compensating the idle torque.

As an exemplary embodiment, the compensating of the shift stage-based torque includes applying, to the compensating the idle torque, compensating a D stage torque which is performed when for a state of the vehicle, a vehicle speed is smaller than a ramp skid upper limit vehicle speed threshold, and a shift stage is a D location or the vehicle direction based on a vehicle speed sensor is reverse on an uphill, and applying, to the compensating the idle torque, compensating an R stage torque which is performed when for the state of the vehicle, the vehicle speed (V) is smaller than the ramp skid upper limit vehicle speed threshold, and at the same time, the shift stage is an R location or the vehicle direction based on the vehicle speed sensor is forward on a downhill.

As an exemplary embodiment, the shift stage-based OBD diagnostic control is performed when the OBD diagnosis is needed in the OBD diagnostic condition, and the shift stage-based OBD diagnostic control includes confirming the state of the vehicle that a vehicle speed is smaller than a ramp skid upper limit vehicle speed threshold, and a shift stage is a D location or the vehicle direction based on a vehicle speed sensor is reverse on an downhill, confirming the state of the vehicle that the vehicle speed is smaller than the ramp skid upper limit vehicle speed threshold, and the shift stage is an R location or the vehicle direction based on the vehicle speed sensor is forward on an uphill, and entering into the OBD diagnosis.

As an exemplary embodiment, the anti-skid countermeasure control includes a third priority anti-skid countermeasure control which performs the generating of the caution message when it is not the primary vehicle speed condition or the torque intervention condition. The generating of the caution message is performed by displaying turn-off/vehicle stop message and turning on a warning lamp.

As an exemplary embodiment, the anti-skid countermeasure control includes a fourth priority anti-skid countermeasure control which performs the generating of the warning message in a PT intervention condition of the powertrain by a secondary vehicle speed condition, and notifies the driver that the forcibly shifting to the neutral stage is performed through the generating of the warning message. The generating of the warning message is performed by displaying the forcibly switching to the shift N stage/vehicle stop message and the turning-on the warning lamp.

As an exemplary embodiment, the fourth priority anti-skid countermeasure control includes confirming a detected vehicle speed as the secondary vehicle speed condition by detecting a vehicle speed, performing a PT protection control with one or more of the vehicle speed, a gradient, a shift stage, and the vehicle direction based on the vehicle speed sensor, performing the generating of the warning message, confirming a vehicle gradient calculation value again, confirming not applying the management condition while confirming the ramp first management condition and the ramp second management condition again through the confirming of the after-startup ramp vehicle movement condition again in the PT non-intervention condition of the powertrain by the secondary vehicle speed condition, and switching to the generating of the notification message in the ramp first management condition or returning to the PT protection control in the ramp second management condition or erasing generated data together with permitting a shift in the not applying the management condition.

As an exemplary embodiment, the vehicle speed satisfies the secondary vehicle speed condition when being smaller than a ramp skid maximum vehicle speed threshold.

As an exemplary embodiment, the PT protection control includes determining necessity for the OBD diagnostic condition, classifying the PT non-intervention condition together with the PT intervention condition with one or more of the vehicle speed, the gradient, and the shift stage when the OBD diagnosis is not needed in the OBD diagnostic condition, forcibly shifting to a neutral with the forcibly shifting to the N stage for protecting the PT in the PT intervention condition, maintaining the shift for a current shift stage in the PT non-intervention condition, and performing an OBD diagnosis based on the forcibly shifting to the neutral when the OBD diagnosis is needed in the OBD diagnostic condition.

As an exemplary embodiment, the forcibly shifting to the neutral includes forcibly shifting to the N stage when for the state of the vehicle, a vehicle speed is smaller than a ramp skid maximum vehicle speed threshold, and a shift stage is a D location or the vehicle direction based on the vehicle speed sensor is reverse on an uphill, and forcibly shifting to the N stage when for the state of the vehicle, the vehicle speed is smaller than the ramp skid maximum vehicle speed threshold, and the shift stage is an R location or the vehicle direction based on the vehicle speed sensor is forward on a downhill.

As an exemplary embodiment, the maintaining of the shift includes maintaining a D stage as a current shift stage when for the state of the vehicle, a vehicle speed is smaller than a ramp skid maximum vehicle speed threshold, and at the same time, a shift stage is a D location or the vehicle direction based on the vehicle speed sensor is forward on a downhill or an uphill, and maintaining an R stage as the current shift stage when for the state of the vehicle, the vehicle speed is smaller than the ramp skid maximum vehicle speed threshold, and the shift stage is an R location or the vehicle direction based on the vehicle speed sensor is reverse on the downhill or the uphill.

As an exemplary embodiment, the classifying the OBD diagnosis based on the forcibly shifting to the neutral includes confirming the state of the vehicle that a vehicle speed is smaller than a ramp skid maximum vehicle speed threshold, and a shift stage is a D location or the vehicle direction based on a vehicle speed sensor is reverse on a downhill, confirming the state of the vehicle that the vehicle speed is smaller than the ramp skid upper limit vehicle speed threshold, and the shift stage is an R location or the vehicle direction based on the vehicle speed sensor is forward on an uphill, confirming the state of the vehicle that the vehicle speed is smaller than the ramp skid upper limit vehicle speed threshold, and the shift stage is a P location or the vehicle direction based on the vehicle speed sensor is reverse or forward on the uphill, or the state of the vehicle that the vehicle speed is smaller than the ramp skid upper limit vehicle speed threshold, and the shift stage is a P location or the vehicle direction based on the vehicle speed sensor is reverse or forward on the downhill, and entering into the OBD diagnosis after the forcibly shifting to the neutral stage.

As an exemplary embodiment, the vehicle gradient calculation value is obtained by a vehicle gradient calculation control, and the vehicle gradient calculation control includes confirming whether a brake pedal is operated after erasing an existing gradient storage value, compensating a current road gradient based on vehicle deceleration if the brake pedal is operated, compensating the current road gradient based on vehicle acceleration if the brake pedal is not operated, and determining the vehicle gradient calculation value through the compensating the road gradient value by the current road gradient compensation calculation value based on the vehicle deceleration or the current road gradient compensation calculation value based on the vehicle acceleration.

As an exemplary embodiment, the compensating of the current road gradient based on the vehicle deceleration includes estimating a vehicle braking force according to an operation of the brake pedal, calculating a vehicle pitch slope of an accelerator sensor with a braking average deceleration, and calculating the current road gradient compensation with an acceleration sensor pitch and a pitch slope by the vehicle deceleration.

As an exemplary embodiment, the calculating of the current road gradient compensation is performed by the difference between the acceleration sensor pitch and the pitch slope by the vehicle deceleration.

As an exemplary embodiment, the compensating of the current road gradient based on the vehicle acceleration includes updating the vehicle speed per a set unit time by not operating the brake pedal, calculating the vehicle acceleration with a change in the vehicle speed per the set unit time, and calculating the current road gradient compensation with an acceleration sensor pitch and a pitch slope by the vehicle acceleration.

As an exemplary embodiment, the calculating of the current road gradient compensation is performed by a difference between the acceleration sensor pitch and the pitch slope by the vehicle acceleration.

As an exemplary embodiment, the confirming of the after-startup ramp vehicle movement condition is performed by an after-startup ramp anti-skid control, and the after-startup ramp anti-skid control includes: detecting a shift stage at a vehicle speed which is greater than a ramp skid lower limit vehicle speed threshold, generating, as a second output, an N stage or a P stage in a matching direction condition between the shift stage and the vehicle speed direction so as to be applied to the ramp first management condition or generating, as the second output, a D stage or an R stage in the opposite direction between the shift stage and the vehicle speed direction so as to be applied to the ramp second management condition, and generating, as a first output, the D stage or the R stage when the vehicle speed is smaller than the ramp skid lower limit vehicle speed threshold or in the matching direction condition between the shift stage and the vehicle speed direction so as to be not applied to the management condition.

As an exemplary embodiment, the confirming the OBD diagnostic record is performed before the second output is generated at the P stage.

Further, a vehicle according to the present disclosure for achieving the object includes a controller which performs any one of a first priority anti-skid countermeasure control in which a brake is operated together with displaying an occurrence of the skid of a vehicle/vehicle stop message when a vehicle starts on a ramp which results in the occurrence of the skid of the vehicle, a second priority anti-skid countermeasure control in which compensating an idle torque is performed together with displaying a guidance of anti-skid function operation/vehicle stop message, a third priority anti-skid countermeasure control in which displaying a turn-off/vehicle stop message is performed, and a fourth priority anti-skid countermeasure control in which forcibly shifting to a N stage or permitting the shift together with displaying a forcibly switching to the shift stage N stage/vehicle stop message is performed; a warning window which displays a message on a vehicle cluster under a control of the controller; and a warning lamp which is turned on the vehicle cluster under the control of the controller.

As an exemplary embodiment, the occurrence of the skid of the vehicle is confirmed by one or more of a vehicle speed, the vehicle direction based on a vehicle speed sensor, and a shift stage after a vehicle gradient calculation value is confirmed.

The method for reinforcing the safety of the vehicle on the ramp applied to the vehicle of the present disclosure implements the following operations and effects.

First, by eliminating the disadvantage of the existing PT-based vehicle anti-skid logic which simply considers only the weight of fuel in the torque control without classifying the engine stall condition and the vehicle skid condition due to the reverse steep slope gradient or the current transmission input stage characteristics, the method may be actually applied to the vehicle to prevent the vehicle from being turned off and skidding when the vehicle starts to move on the reverse steep ramp. Second, it is possible to reinforce the function for the PT durability management and the risk management, which occur when the weight of fuel is not limitedly specified, with the transmission input stage classification and engine stall detection logic. Third, by notifying the user of the skid condition on the reverse steep slope gradient, it is possible to simultaneously protect the durability of the vehicle and secure the passenger's safety. Fourth, by implementing logic of each of the input stage classification for confirming the state of the vehicle, the comparison of the shift stage-vehicle speed, the determination of the road surface average slope, and the determination/prevention of the engine stall, it is possible to perform the function of increasing the engine torque for each situation or forcibly entering into the N stage through the diagnosis of each vehicle state condition when the vehicle skids. Fifth, it is possible to implement the vehicle anti-skid function up to the certain slope and speed even for the vehicle having no separate electronic braking system such as the EPB by reinforcing the safety of the vehicle on the ramp through the PT-based vehicle anti-skid logic, and to secure the braking negative pressure by maximally maintaining the startup state even upon the occurrence of the skid of the vehicle, thereby further maximizing the passenger's safety.

BRIEF DESCRIPTION OF THE FIGURES

FIGS. 6A and 6B are a diagram illustrating an example of an after-startup ramp anti-skid control in the method for reinforcing safety of the vehicle on the ramp according to the present disclosure.

Hereinafter, exemplary embodiments of the present disclosure will be described in detail with reference to the accompanying exemplary drawings, and since these exemplary embodiments are examples and may be implemented in various different forms by those skilled in the art to which the present disclosure pertains, they are not limited to the exemplary embodiments described herein.

Figure 1:
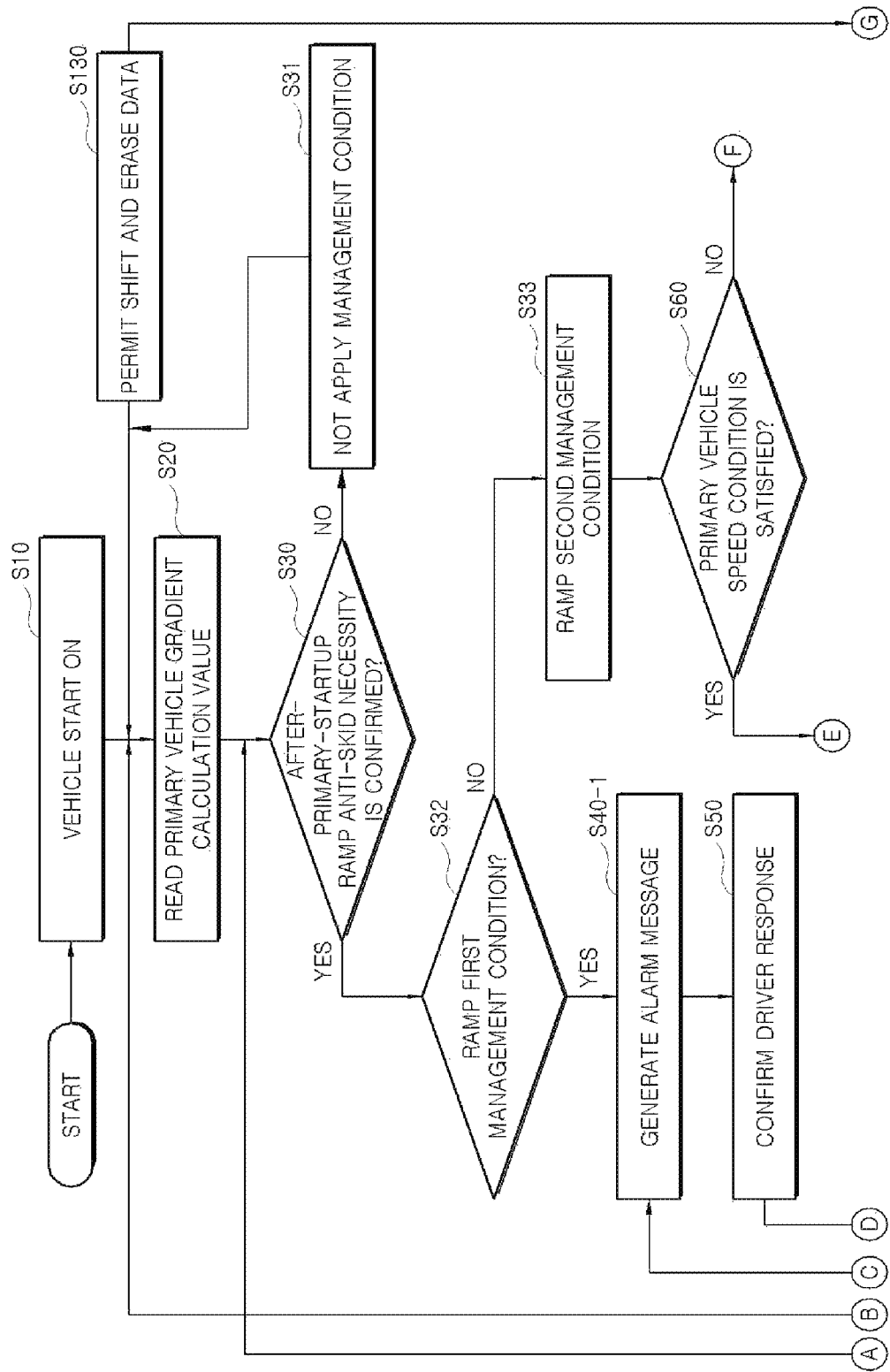
FIGS. 1, 2, and 3 are flowcharts illustrating a method for reinforcing safety of a vehicle on a ramp according to the present disclosure.
Figure 2:
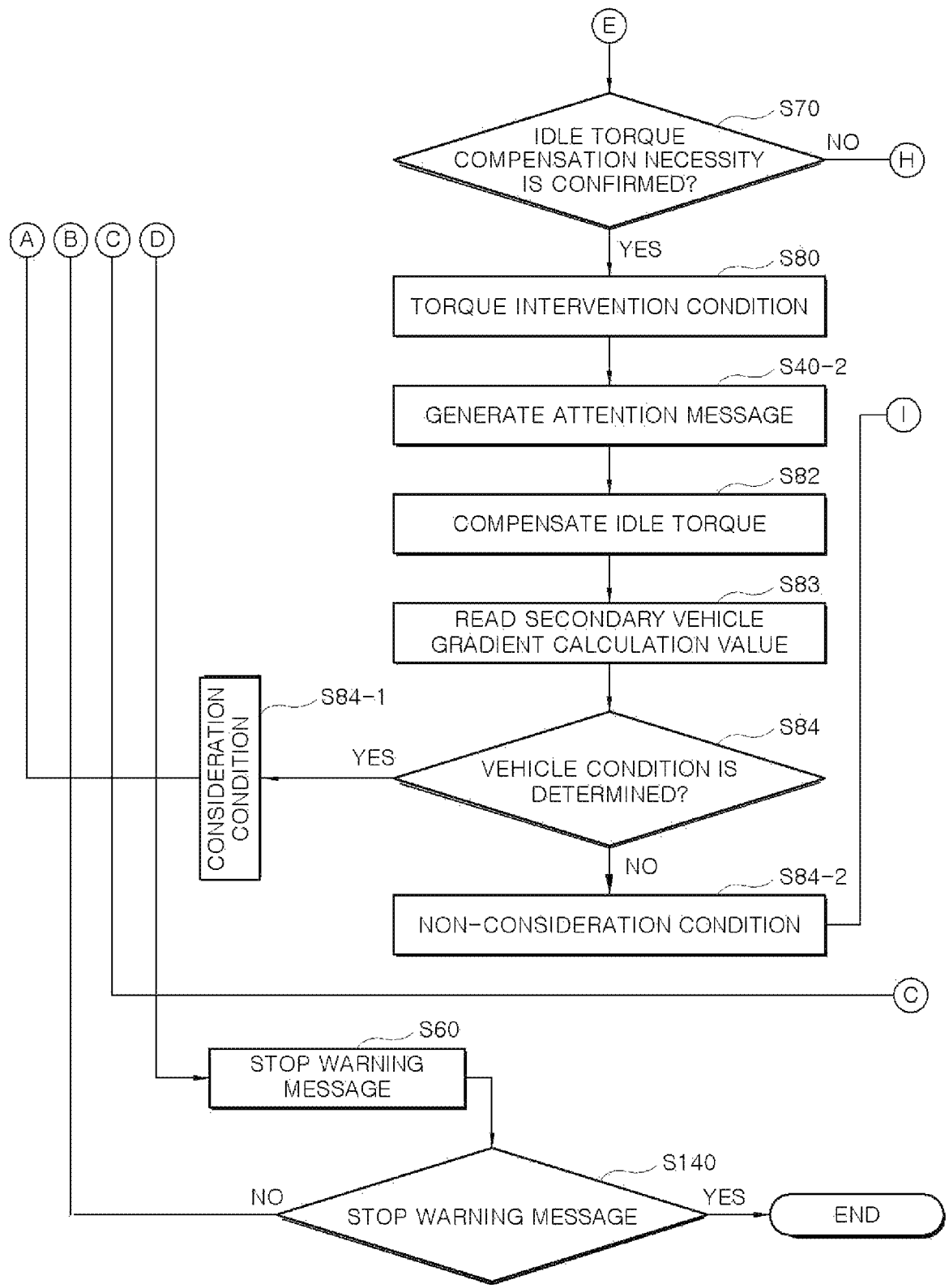
Figure 3:
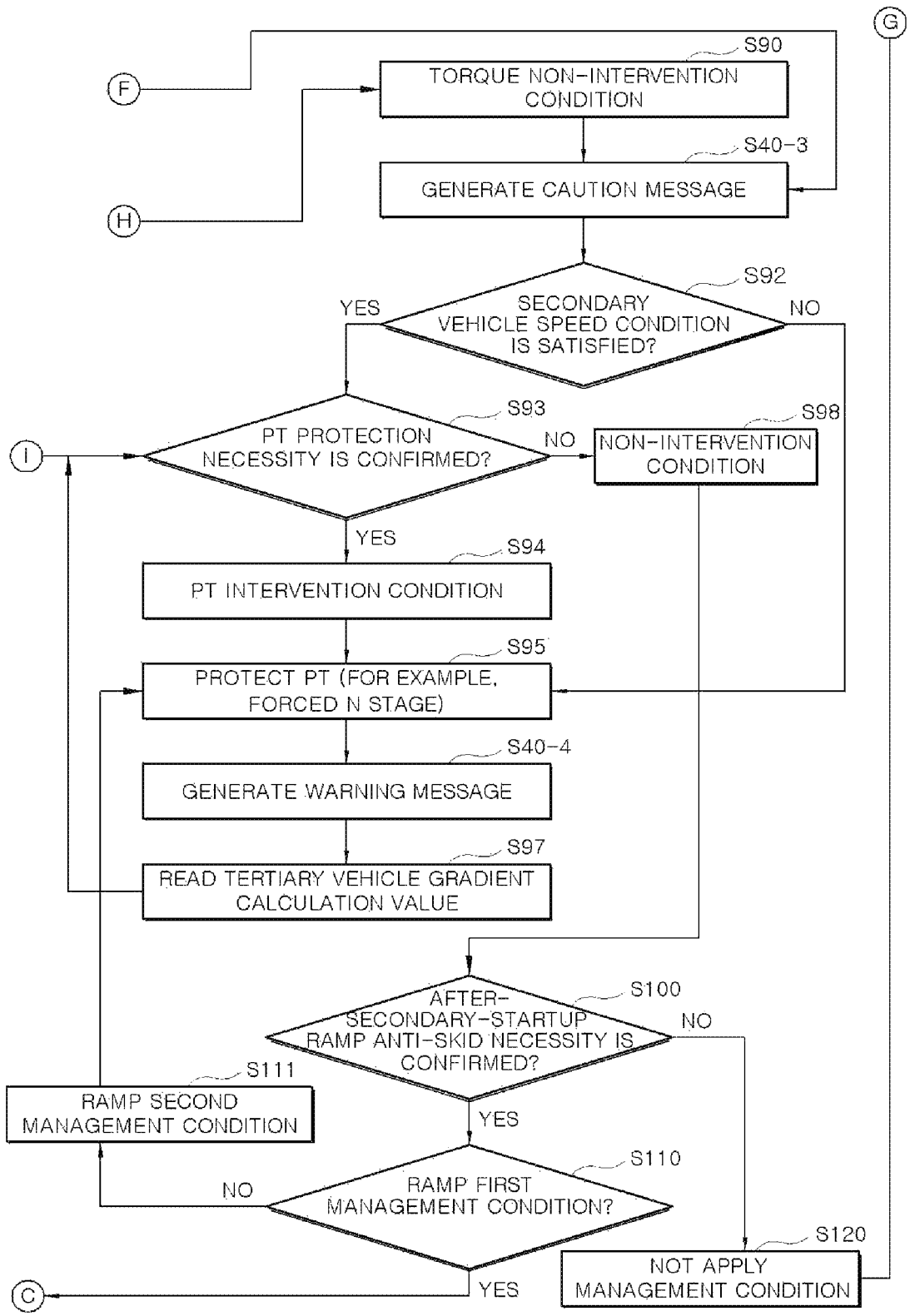

Referring to FIGS. 1 to 3, a method for reinforcing safety of a vehicle on a ramp performs an anti-skid countermeasure control which confirms a vehicle slope calculation value at S20 when an engine of a vehicle starts at S10, and then confirms an after-startup ramp vehicle movement condition in which a ramp management condition is confirmed by any one of a vehicle speed, a vehicle direction based on a vehicle speed sensor, and a shift stage at S30, and uses, as a message rating, any one of generating an notification message at S40-1, generating an attention message at S40-2, generating a caution message at S40-3, and generating a warning message at S40-4 to vary a driver's recognition for the skid of the vehicle, and to select an operation of a brake of the vehicle, compensation of an idle torque, and a forcible shift to a neutral (N) stage according to the message ratings.

Particularly, the anti-skid countermeasure control classifies a ramp vehicle skid rating under a first priority anti-skid countermeasure control at S32, S40-1, S50, and S50-1, a second priority anti-skid countermeasure control at S33, S60, S70, S80, S82, S83, S84, and S84-2, a third priority anti-skid countermeasure control at S60, S90, and S40-3, and a fourth priority anti-skid countermeasure control at S92, S93, S94, S95, S97, S98, S100, S110, S111, S120, and S130 to be performed sequentially.

Furthermore, the method for reinforcing the safety of the vehicle on the ramp generates different warning messages in each of the first to fourth priority anti-skid countermeasures.

As an example, the first priority anti-skid countermeasures (S32, S40-1, S50, S50-1) performs the generating of the notification message at S40-1 according to a ramp first management condition at S32, the second priority anti-skid countermeasures (S33, S60, S70, S80, S82, S83, S84, S84-2) performs the generating of the attention message at S40-2 according to a torque intervention condition at S80, the third priority anti-skid countermeasures (S60, S90, S40-3) performs the generating of the caution message at S40-3 according to a torque non-intervention condition at S90, and the fourth priority anti-skid countermeasures (S92, S93, S94, S95, S97, S98, S100, S110, S111, S120, S130) performs the generating of the warning message at S40-4 according to a PT intervention condition at S94.

Accordingly, the method for reinforcing the safety of the vehicle on the ramp may implement a total of four levels of driving notification ratings as the warning message, thereby not only eliminating the fear of traveling on the ramp from a novice driver who is not good at driving but also fundamentally blocking the risk of an accident.

As described above, the method for reinforcing the safety of the vehicle on the ramp may implement shift input stage classification logic, shift stage-vehicle speed comparison logic, road surface average slope determination logic, and engine stall determination/prevention logic, which confirm the state of the vehicle, in order to implement at least four levels of ramp vehicle anti-skid countermeasures, thereby implementing the vehicle anti-skid function up to constant gradient and startup speed even for the vehicle having no separate electronic braking system such as the EPB, and particularly, may maximally maintain the startup state of the vehicle even if the skid of the vehicle occurs to secure the braking negative pressure, thereby maximizing the passenger's safety.

Figure 4:
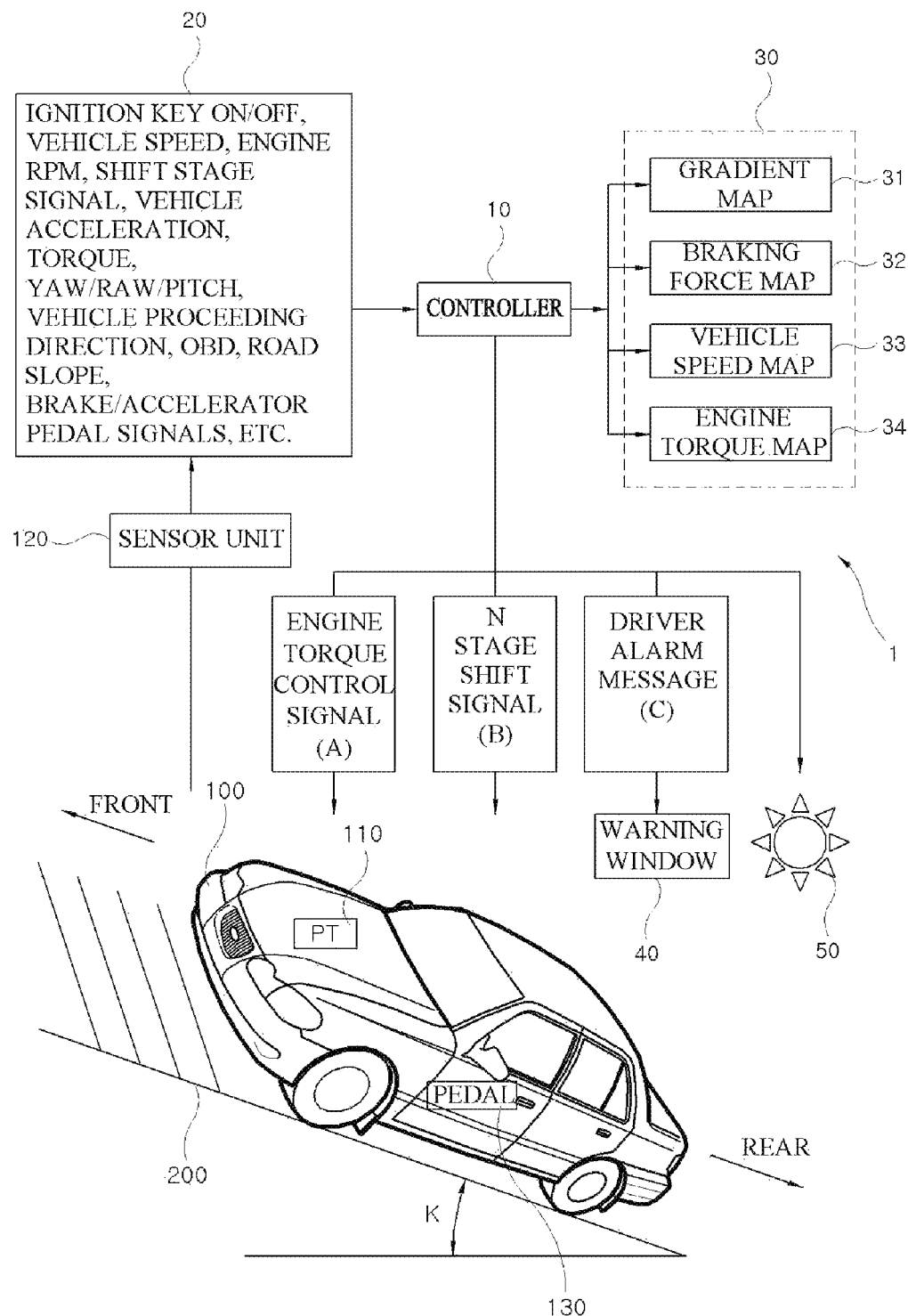
FIG. 4 is a diagram illustrating an example of a vehicle in which a control of reinforcing the safety of the vehicle on the ramp according to the present disclosure is implemented.

Meanwhile, referring to FIG. 4, a vehicle 100 includes a powertrain 110, a sensor unit 120, and a pedal 130 to mount a ramp safety reinforcement system 1, and uses a controller area network (CAN) for mutual communication.

Specifically, the powertrain 110 includes an engine and a transmission, and an inhibitor switch which generates a P-N-D-R shift stage signal generates a shift stage signal. The sensor unit 120 is included as a vehicle basic sensor together with a vehicle speed sensor which is mounted to the vehicle 100 to detect the state of the vehicle during the driving of the vehicle 100 based on sensor information, and detect a vehicle speed by which the vehicle direction is determined as forward or reverse based on the vehicle speed sensor with respect to the vehicle direction in which the vehicle moves, an engine revolution per minute (RPM) or an RPM sensor, a road surface gradient sensor or an acceleration sensor for calculating the gradient of the vehicle, a brake/accelerator pedal sensor, an inhibitor switch sensor, and the like. The pedal 130 is a brake pedal and an accelerator pedal. In this case, the pedal 130 provides the shift stage signal and the sensor detection information to a controller 10 or an input unit 20 of the ramp safety reinforcement system 1.

Specifically, the ramp safety reinforcement system 1 includes a controller 10, an input unit 20, a map unit 30, a warning window 40, and a warning lamp 50.

As an example, the controller 10 has a memory which stores a program of logics for the vehicle gradient calculation control at S20, the after-startup ramp anti-skid control at S30, the warning message control at S40, the idle torque compensation control at S70, the PT protection necessity control at S93, and the engine stall diagnosis at S720, which are applied to each of the first to fourth priority anti-skid countermeasures, and operates as a central processing unit (CPU) in which the logics are executed.

As an example, the input unit 20 provides, as sensor detection information of the sensor unit 120 together with a shift stage signal, the ignition key ON/OFF, the vehicle speed, the forward and reverse of the vehicle direction classified based on the vehicle speed sensor, the engine RPM, the shift stage, the vehicle acceleration, the torque, the yaw/raw/pitch, the road slope, and the brake/acceleration pedal signals to the controller 10, and particularly, provides diagnostic information of an On Board Diagnosis (OBD) to the controller 10. In this case, the shift stage signal is classified into P (Parking), N (Neutral), D (Drive), and R (Rear or Reverse).

As an example, the map unit 30 is composed of a gradient map 31, a braking force map 32, a vehicle speed map 33, and an engine torque map 34. The gradient map 31 constructs a vehicle ramp skid table based on a road gradient (K) of a ramp 200 where the vehicle 100 is located, the braking force map 32 constructs a braking table according to the depression of the brake pedal, the vehicle speed map 33 constructs a vehicle speed table with respect to a throttle opening according to the depression of the accelerator pedal, and the engine torque map 34 constructs an engine torque table with respect to the throttle opening.

As an example, each of the warning window 40 and the warning lamp 50 are provided in a cluster forming the driver seat of the vehicle 100. The warning window 40 displays characters recognized by the driver, and the warning lamp 50 is turned on so that the driver brings hi s/her attention.

Hereinafter, the method for reinforcing the safety of the vehicle on the ramp illustrated in FIGS. 1 to 3 will be described in detail with reference to FIGS. 4 to 9B. In this case, the control subject is the controller 10 of the ramp safety reinforcement system 1, and the control target is the warning window 40 for text display and the warning lamp 50 for the turn-on which are provided on the cluster of the driver seat together with the inhibitor switch which generates the signal for switching to a shift N stage of the engine and the transmission configuring the powertrain 110 of the vehicle 100.

Referring to FIGS. 1 to 3, the controller 10 confirms the startup of the vehicle at S10, reads a vehicle gradient calculation value (for example, a primary vehicle gradient calculation value) at S20, and then confirms the after-startup ramp anti-skid necessity at S30.

As an example, the vehicle gradient calculation value (for example, the primary vehicle gradient calculation value) (S20) is obtained by the acceleration sensor of the sensor unit 120, which is described by the vehicle gradient calculation control (S201 to S213) illustrated in FIG. 4. In addition, the confirming of the after-startup ramp anti-skid necessity (S30) is composed of the vehicle speed, the vehicle direction based on the vehicle speed sensor, and the shift stages P, N, D, R and is described by the after-startup ramp anti-skid control (S300, S310, S330, S340, S350, S360, S360-1, S360-2, S360-3, S370, S380, S380-1, S380-2, S290-1, S390-2).

Referring to FIG. 4, the controller 10 confirms the forward or reverse of the vehicle and the shift stage location thereof, and the vehicle gradient calculation value according to the road gradient (K) with the vehicle direction determined based on the vehicle speed sensor by detecting the vehicle speed of the sensor unit 120, the engine RPM, and the shift stage signal while confirming the startup of the engine with an ignition key ON signal among the information of the input unit 20. In this case, for the vehicle direction based on the vehicle speed sensor, a positive value (+) for the vehicle speed detected by the vehicle speed sensor of the sensor unit 120 is recognized as the forward of the vehicle direction whereas a negative value (−) therefor is recognized as the reverse of the vehicle direction, which are typical functions.

As a result, the vehicle gradient calculation value (S20) is confirmed as the gradient of the vehicle according to the road gradient (K) of the ramp 200, and the confirming of the after-startup ramp anti-skid necessity (S30) is classified into a management condition non-application state (S31), a ramp first management condition state (S32), or a ramp second management condition state (S33).

Figure 5:
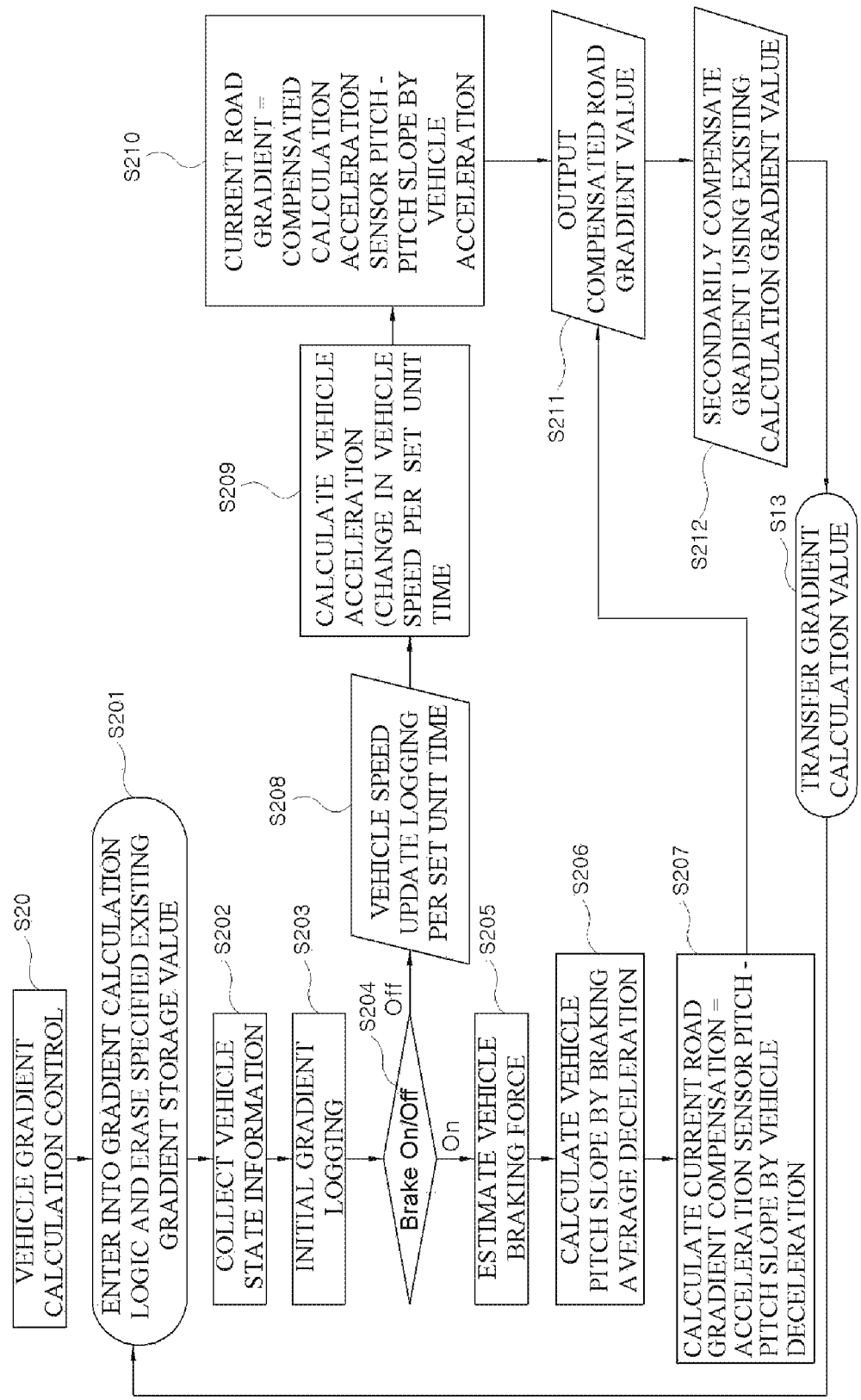
FIG. 5 is a flowchart illustrating a vehicle slope calculation control in the method for reinforcing safety of the vehicle on the ramp according to the present disclosure.

FIG. 5 illustrates the vehicle gradient calculation control (S201 to S213) for the vehicle gradient calculation value (S20).

First, the controller 10 performs entering into gradient calculation logic and erasing a specified existing gradient storage value through calculating the gradient at S201, performs collecting vehicle state information at S202 followed by logging an initial gradient at S203, and then confirming whether the brake pedal is operated at S204.

Then, the controller 10 performs compensating a vehicle deceleration-based current road gradient (S205 to S207) if the brake pedal is operated in the confirming an operation of the brake pedal (S204) or performs compensating a vehicle acceleration-based current road gradient (S208 to S210) if the brake pedal is not operated.

As an example, the compensating of the vehicle deceleration-based current road gradient (S205 to S207) includes estimating a vehicle braking force at S205, calculating a vehicle pitch slope by the braking average deceleration at S206, and calculating current road gradient compensation at S207.

Particularly, the calculating of the current road gradient compensation at S207 uses the following vehicle deceleration-based compensation formula.

Vehicle deceleration-based compensation formula: calculation of the vehicle deceleration-based current road gradient compensation=acceleration sensor pitch−pitch slope by the vehicle deceleration As an example, the calculating of the vehicle acceleration-based current road gradient compensation (S208 to S210) includes update-logging a vehicle speed per a set unit time at S208, calculating a vehicle acceleration (a change in the vehicle speed per the set unit time) at S209, and calculating the current road gradient compensation at S210.

Particularly, the calculating of the current road gradient compensation at S210 uses a vehicle acceleration-based compensation formula.

Vehicle acceleration-based compensation formula: calculation of the vehicle acceleration-based current road gradient compensation=acceleration sensor pitch−pitch slope by the vehicle acceleration As a result, the controller 10 performs outputting a compensated road gradient value at S211, secondarily compensating an existing calculation gradient value use-based gradient at S212, and transferring the gradient calculation value at S213 using the vehicle deceleration-based current road gradient compensation calculation value (S207) or the vehicle acceleration-based current road gradient compensation calculation value (S210).

Accordingly, the controller 10 may use the gradient calculation value (S213) in the reading of the vehicle gradient calculation value (S20).

Figure 6B:
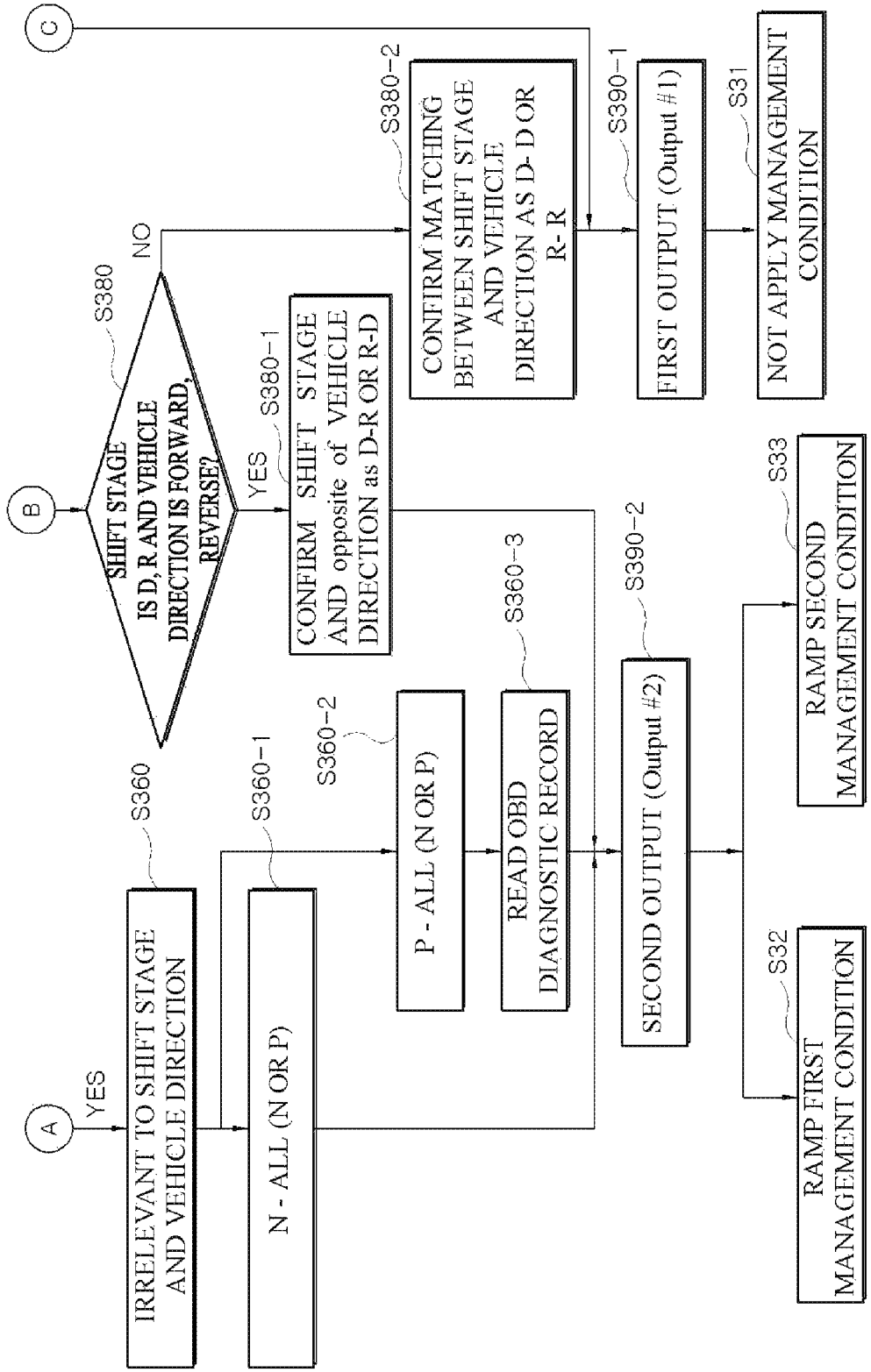

FIGS. 6A and 6B illustrate the after-startup ramp anti-skid control (S300, S310, S330, S340, S350, S360, S360-1, S360-2, S360-3, S370, S380, S380-1, S380-2, S290-1, S390-2) for the confirming of the after-startup ramp anti-skid necessity (S30).

First, the controller 10 performs detecting a $1^{st}$ input at S300 and determining the $1^{st}$ input at S310.

In this case, the detecting of the 1st input (S300) is the vehicle speed (V), and the determining of the 1st input (S310) applies the following vehicle startup determination formula using the vehicle speed.

Vehicle startup determination formula: V>A1 (set value 1)

In the vehicle startup determination formula, "V" refers to a current detection speed value of the vehicle 100, "A1" refers to a vehicle skid possibility in the road gradient (K) condition of the ramp 200 as a set value 1 of a ramp skid lower limit vehicle speed threshold, and ">" refers to an inequality sign indicating the relationship size between two values. Accordingly, the ramp skid lower limit vehicle speed threshold (A1) varies depending on the weight of the vehicle and the size of the road gradient (K) and thus is not limited to a specific value.

As a result, if the "current detection speed value (V)>A1 (set value 1)" is not satisfied in the determining of the 1st input (S310), the controller 10 switches to a first output (Output #1) (S390-1) to perform not applying the management condition at S31.

Meanwhile, if the "current detection speed value (V)>A1 (set value 1)" is satisfied in the determining the 1st input (S310), the controller 10 enters into detecting a 2nd input at S330.

Subsequently, the controller 10 performs the detecting of the 2nd input for the shift stages N, D, P, R at S320, classifying an output by matching the shift stage confirmed by detecting the shift stage location with the vehicle direction based on the vehicle speed sensor detected and confirmed by the vehicle speed sensor of the sensor unit 120 (S340, S350, S360, S360-1, S360-2, S360-3, S370, S380, S380-1, S380-2), entering into the not applying of the management condition (S31) through the first output (Output #1) at S390-1, and entering into the ramp first management condition (S32) or the ramp second management condition (S33) through the second output (Output #2) at S390-2.

Specifically, the classifying of the output by matching the shift stage with the vehicle direction based on the vehicle speed sensor (S340, S350, S360, S360-1, S360-2, S360-3, S370, S380, S380-1, S380-2) is classified into generating an output in a condition in which the shift stage and the vehicle direction based on the vehicle speed sensor are matched (S350, S360, S360-1, S360-2, S360-3) by matching the shift stage location with the vehicle direction based on the vehicle speed sensor (S340), and generating an output in a mismatched condition by matching the shift stage location with the vehicle direction based on the vehicle speed sensor (S370, S380, S380-1, S380-2).

As an example, the generating of the output in the condition in which the shift stage location and the vehicle direction based on the vehicle speed sensor are matched (S350, S360, S360-1, S360-2, S360-3) includes confirming the shift stage location as a shift stage N or P at S350, confirming a condition in which the vehicle direction based on the vehicle speed sensor detected and confirmed by the vehicle speed sensor of the sensor unit 120 is irrelevant to the shift stage location (S360) as a vehicle neutral (N—ALL (N or P)) at S360-1 or confirming the condition as a vehicle parking (P—ALL (N or P)) at S360-2.

As a result, the vehicle neutral (N—ALL (N or P)) (S360-1) generates the second output (Output #2) at S390-2, whereas the vehicle parking (P—ALL (N or P)) (S360-2) reads the OBD diagnostic record (S360-3) to determine the state of the vehicle and then generates the second output (Output #2) at S390-2.

As an example, the generating of the output in the condition in which the shift stage location and the vehicle direction based on the vehicle speed sensor are not matched (S370, S380, S380-1, S380-2) includes confirming the shift stage location as the shift stage D or R at S370, matching the vehicle direction based on the vehicle speed sensor detected and confirmed by the vehicle speed sensor of the senor unit 120 with D or R which is the detected shift stage location at S380 and as a result, confirming the vehicle direction as D (shift stage location)—R (reverse of the vehicle direction based on the vehicle speed sensor) or R (shift stage location)—D (forward of the vehicle direction based on the vehicle speed sensor) with respect to the shift stages D, R at S380-1, or confirming the vehicle direction based on the vehicle speed sensor as D (shift stage location)—D (forward of the vehicle direction based on the vehicle speed sensor) or R (shift stage location)—R (reverse of the vehicle direction based on the vehicle speed sensor) with respect to the shift stages D, R at S380-2.

As a result, the D (shift stage location)—the R (reverse of the vehicle direction based on the vehicle speed sensor) or the R (shift stage location)—the D (forward of the vehicle direction based on the vehicle speed sensor) (S380-1) generates the second output (Output #2) at S390-2, whereas the D (shift stage location)—the D (forward of the vehicle direction based on the vehicle speed sensor) or the R (shift stage location)—the R (reverse of the vehicle direction based on the vehicle speed sensor) (S380-2) generates the first output (Output #1) at S390-1.

Table 1 below shows an example representing the relationship between the 1st input/2nd input and Output #1/Output #2 under the after-startup ramp anti-skid control with an after-startup ramp anti-skid logic entry presence/absence determination logic matrix.

TABLE 1

| | | Example of the after-startup ramp anti-skid Determination condition | | | | | | | | |
|---|---|---|---|---|---|---|---|---|---|---|
| 1st Input | Vehicle speed | Vehicle speed ≥ set value 1 | | | | | | Set value 1 ≥ vehicle speed | | |
| 2nd Input | Shift stage | N | P | D | R | D | R | Output #1 | Below management condition |
| | Vehicle direction | ALL | ALL | D | R | R | D | | |
| Output #2 | Determination result | Case #1 | | Below management condition | | Case #2 | | | |

TABLE 1-continued

Example of the after-startup ramp anti-skid
Determination condition

| 1st Input | Vehicle speed | | | Vehicle speed ≥ set value 1 | | Set value 1 ≥ vehicle speed |
|---|---|---|---|---|---|---|
| | Post-process | Perform Logic chart flow | Perform logic chart flow and record OBD diagnosis | Perform logic chart flow | Perform logic chart flow | |

NOTES: the vehicle direction ALL is irrelevant to forward or reverse of the vehicle, the vehicle direction D means forward of the vehicle and the vehicle direction R means reverse of the vehicle, respectively Referring back to FIGS. 1 to 3, the controller 10 enters into the first priority anti-skid countermeasures (S32, S40-1, S50, S50-1) in the ramp first management condition (S32) of the second output (Output #2) (S390-2). In this case, the first priority anti-skid countermeasures (S32, S40-1, S50, S50-1) perform the inducing the operation of the brake pedal (S50) according to the ramp first management condition (S32) of the after-startup ramp vehicle movement condition (S30), which is irrelevant to the vehicle direction based on the vehicle speed sensor, in the vehicle gradient (S20).

Specifically, the first priority anti-skid countermeasure (S32, S40-1, S50, S50-1) include the entering into the ramp first management condition at S32 in the confirming the after-startup ramp anti-skid necessity (for example the confirming of the after-primary startup ramp anti-skid necessity) at S30, the generating of the notification message (for example, the first driver warning message) at S40-1, the confirming of the driver's response according to the warning message instruction by generating the brake pedal signal during the operation of the pedal 130 at S50, and stopping the warning message at S50-1. In this case, the generating of the notification message (for example, the first driver warning message) (S40-1) will be described in detail with reference to FIG. 7.

Furthermore, the controller 10 terminates the warning message at S50-1 and then terminates the control logic for reinforcing the safety of the vehicle on the ramp when it is confirmed that the vehicle is turned off at S140, but returns to the confirming the after-startup ramp anti-skid necessity at S20 when it is not confirmed that the vehicle is turned off, thereby continuing the control logic for reinforcing the safety of the vehicle on the ramp.

On the other hand, the controller 10 enters into the second priority anti-skid countermeasures (S33, S60, S70, S80, S82, S83, S84, S84-2) in the second management condition (S33) of the second output (Output #2) (S390-2). In this case, the second priority anti-skid countermeasures (S33, S60, S70, S80, S82, S83, S84, S84-2) perform the inducing of the operation of the brake pedal at S50 with the first vehicle speed condition at S60 according to the idle torque compensation condition at S70 relevant to the engine stall condition in the ramp second management condition at S33 of the after-startup ramp vehicle movement condition at S30 which is relevant to the vehicle direction based on the vehicle speed sensor.

Specifically, the second-priority anti-skid countermeasures (S33, S60, S70, S80, S82, S83, S84, S84-2) include confirming whether the primary vehicle speed condition is satisfied at S60 in the ramp second management condition at S33, classifying the torque intervention condition at S80 or the torque non-intervention condition at S90 through the confirming of the idle torque compensation necessity at S70, generating the attention message (for example, the second driver warning message) at S40-2 in the torque intervention condition at S80, compensating the idle torque at S82, reading the vehicle gradient calculation value (for example, the secondary vehicle gradient calculation value) at S83, and classifying a consideration condition at S84-1 or a non-consideration condition at S84-2 through the confirming the vehicle condition at S84. In this case, the generating the attention message (for example, the second driver warning message) at S40-2 will be described in detail with reference to FIGS. 7A and 7B.

As an example, the confirming of the first vehicle speed condition satisfaction (S60) applies a first vehicle skid determination formula.

First vehicle skid determination formula: $A2 > V > A1$

In the first vehicle skid determination formula, "V" refers to the current detection speed value of the vehicle 100, "A1" refers to the vehicle skid possibility in the road gradient (K) condition of the ramp 200 as the set value 1 of the ramp skid lower limit vehicle speed threshold, "A2" refers to a relatively high vehicle skid possibility in the road gradient (K) condition of the ramp 200 as a set value 2 of the ramp skid upper limit vehicle speed threshold, and ">" refers to the inequality sign indicating the size relationship of two values. Accordingly, the ramp skid upper limit vehicle speed threshold (A2) varies depending on the weight of the vehicle and the size of the road gradient (K) like the ramp skid lower limit vehicle speed threshold (A1), and thus is not limited to a specific value.

As a result, if the "ramp skid upper limit vehicle speed threshold (A2)>current detection speed (V)>ramp skid lower limit vehicle speed threshold (A1)" is not satisfied, the controller 10 switches to the third priority anti-skid countermeasures (S95 to S97) whereas if satisfied, the controller 10 enters into the confirming of the idle torque compensation necessity (S70).

As an example, the confirming of the idle torque compensation necessity (S70) is classified into the torque intervention condition (S80) and the torque non-intervention condition (S90) switched to the third priority anti-skid countermeasures (S95 to S97). In this case, the confirming of the idle torque compensation necessity (S70) is performed based on the determination of the vehicle driving state using the vehicle speed, the gradient calculation value by the road gradient (K), the shift stages P, N, D, R, the vehicle direction for each forward/reverse based on the vehicle speed sensor detected and confirmed by the vehicle speed sensor of the sensor unit 120, the occurrence of the stall (the engine or the transmission), and the like, which will be described by the idle torque compensation control (S700, S710, S720, S730, S740, S741, S742, S750, S751, S752, S760, S770, S771, S780, S790) illustrated in FIG. 5.

As a result, the torque intervention condition at S80 performs the generating of the attention message (for example, the second driver warning message) at S40-2, and then enters into the compensating of the idle torque at S82 as the second priority anti-skid countermeasures (S80, S82, S83, S84, S84-1, S84-2) continue.

As an example, the compensating of the idle torque at S82 compensates the idle torque of the engine based on the vehicle speed and gradient calculation values, and the idle torque compensation value is an engine RPM which prevents the vehicle from skidding or being turned off.

As an example, the reading of the vehicle gradient calculation value (for example, a secondary vehicle gradient calculation value) at S83 means the vehicle gradient calculation value obtained by the vehicle gradient calculation control (S201 to S213) illustrated in FIG. 4 in the condition of the second priority anti-skid countermeasures (S80, S82, S83, S84, S84-1, S84-2). Accordingly, when the vehicle gradient calculation value at S20 is the primary vehicle gradient calculation value, the vehicle gradient calculation value at S83 is the secondary vehicle gradient calculation value.

As an example, the confirming of the vehicle condition at S84 is performed by reaching a target vehicle speed and the vehicle driving state, and if the reaching the target vehicle speed and the vehicle driving state are confirmed, the vehicle condition (S84) switches to the consideration condition (S84-1) whereas if not confirmed, the vehicle condition (S84) switches to the non-consideration condition (S84-2).

As a result, the second priority anti-skid countermeasures (S33, S60, S70, S80, S82, S83, S84, S84-2) enter into the confirming of the after-primary startup ramp anti-skid necessity at S30 in the case of the consideration condition at S84-1 to perform the first priority anti-skid countermeasures (S32, S40-1, S50, S50-1) again, whereas switching to the fourth priority anti-skid countermeasures (S92, S93, S94, S95, S97, S98, S100, S110, S111, S120, S130) in the case of the non-consideration condition at S84-2 to enter into the confirming of the PT protection necessity at S93.

Figure 7A:
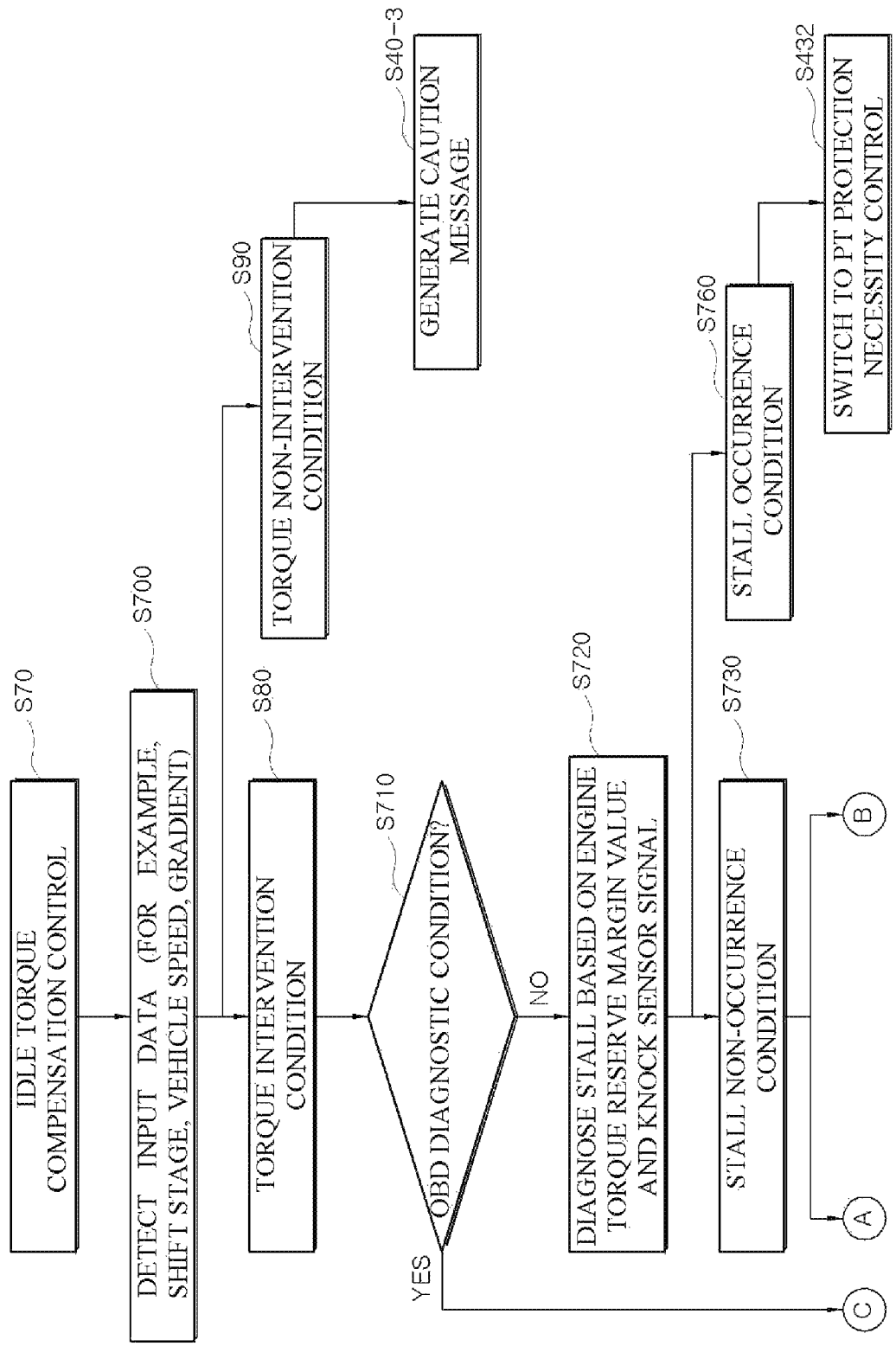
FIGS. 7A and 7B are a diagram illustrating an example of an idle torque compensation control in the method for reinforcing safety of the vehicle on the ramp according to the present disclosure.
Figure 7B:
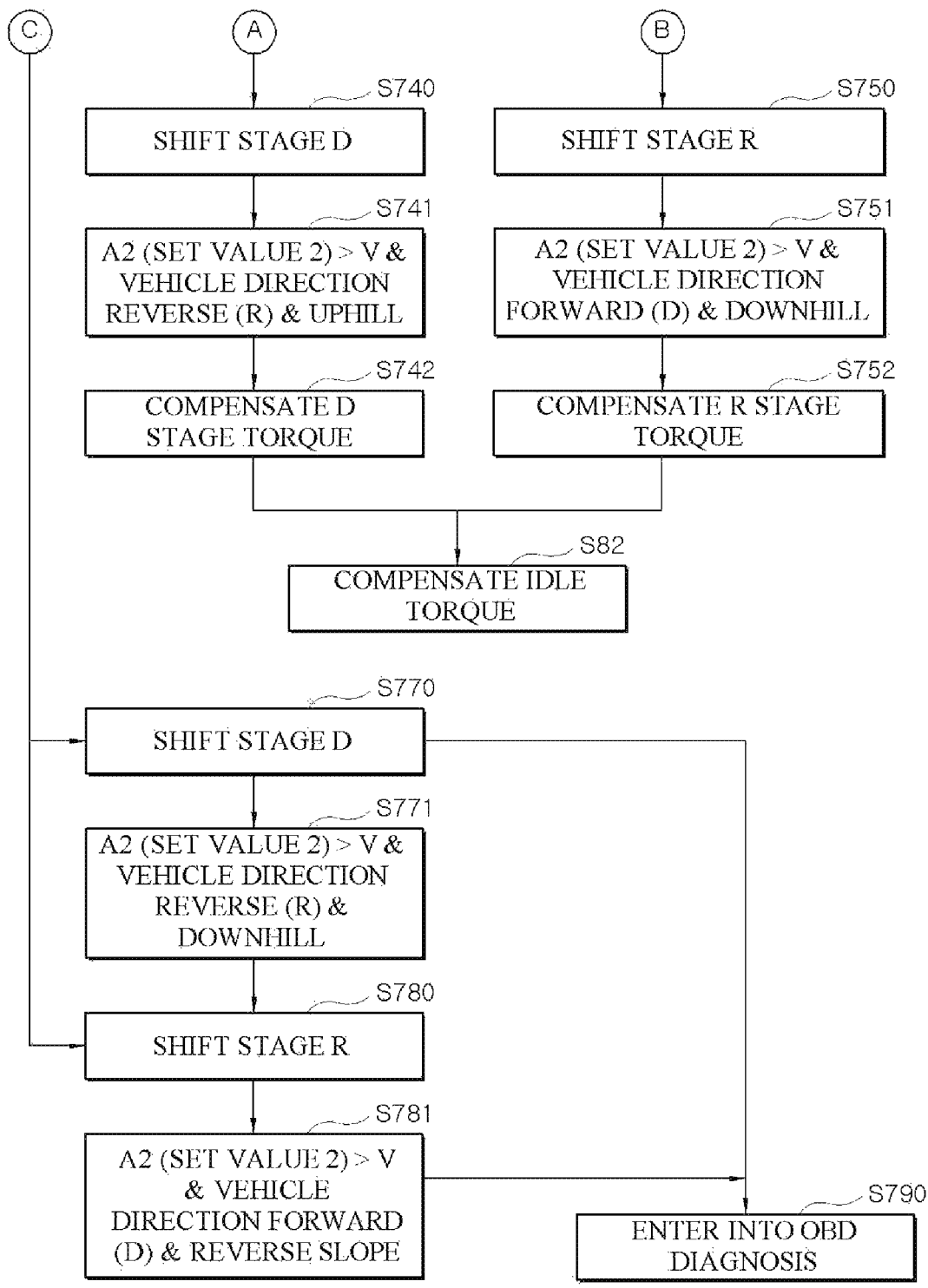

FIGS. 7A and 7B illustrate the idle torque compensation control (S700, S710, S720, S730, S740, S741, S742, S750, S751, S752, S760, S770, S771, S780, and S790) for the confirming of the idle torque compensation necessity at S70.

First, the controller 10 detects the shift stage, the vehicle speed, the road gradient (K), or the vehicle gradient calculation value from the input DATA at S700, and thus classifies the torque intervention condition at S80, or the torque non-intervention condition at S90 therefrom.

As a result, the torque non-intervention condition at S90 switches to the generating of the caution message (for example, a third driver warning message) at S40-3 among the third priority anti-skid countermeasures (S60, S90, S40-3) whereas the torque intervention condition at S80 continues the second priority anti-skid countermeasures (S33, S60, S70, S80, S82, S83, S84, S84-2) to enter into the confirming an OBD diagnostic condition at S710.

Subsequently, the controller 10 performs compensating the shift stage-based torque (S720, S730, S740, S741, S742, S750, S751, S752) if the OBD diagnosis is not needed in the confirming of the OBD diagnostic condition at S710, whereas performing classifying the shift stage-based OBD diagnosis (S770, S771, S780, S790) if the OBD diagnosis is needed.

As an example, the compensating of the shift stage-based torque (S720, S730, S740, S741, S742, S750, S751, S752) performs diagnosing a stall based on an engine torque reserve margin value and a knock sensor signal at S720, and as a result, is classified into a stall non-occurrence condition at S730 which enters into compensating a torque for each shift stage (S740, S741, S742, S750, S751, S752) and a stall occurrence condition step at S760, which switches to the confirming of the PT protection necessity at S93 among the fourth priority anti-skid countermeasures (S92, S93, S94, S95, S97, S98, S100, S110, S111, S120, S130).

Specifically, the compensating of the shift stage-based torque (S720, S730, S740, S741, S742, S750, S751, S752) performs the compensating of the shift stage-based torque (S720, S730, S740, S741, S742, S750, S751, S752) with reading the shift stage (D) at S740, reading a D stage torque compensation condition at S741, and compensating the D stage torque at S742 or includes reading the shift stage at S750, reading an R stage torque compensation condition at S751, and compensating the R stage torque at S752.

Particularly, the reading of the D stage torque compensation condition at S741 is performed in the vehicle direction reverse condition by the following vehicle speed sensor, and the reading of the R stage torque compensation condition at S751 is performed in the vehicle direction forward condition by the following vehicle speed sensor.

Vehicle direction reverse condition by the vehicle speed sensor: A2 (set value 2)>V & reverse vehicle direction & uphill Vehicle direction forward condition by the vehicle speed sensor: A2 (set value 2)>V & forward vehicle direction & downhill In the vehicle direction reverse and forward condition formulas, "V" refers to the current detection speed value of the vehicle 100, "A2" refers to the ramp skid upper limit vehicle speed threshold, and "&" refers to the and condition.

Accordingly, the compensating of the D stage torque at S742 is performed when for the current state of the vehicle 100, the ramp skid upper limit vehicle speed threshold (A2) is greater than the current detection vehicle value (V) on the uphill, and at the same time, the shift stage is a D location or the vehicle direction confirmed by the vehicle speed sensor is reverse. On the other hand, the compensating of the R stage torque at S752 is performed when for the current state of the vehicle 100, the ramp skid upper limit vehicle speed threshold (A2) is greater than the current detection vehicle value (V) on the downhill, and at the same time, the shift stage is an R location or the vehicle direction confirmed by the vehicle speed sensor is forward.

As a result, the results of the compensating of the D stage torque at S742 and the compensating of the R stage torque at S752 are provided to the compensating of the idle torque at S82.

As an example, the classifying of the shift stage-based OBD diagnosis (S770, S771, S780, S790) includes reading the shift stage D at S770, reading the D stage OBD diagnostic condition at S771 or reading the shift stage R at S780, reading the R stage OBD diagnostic condition at S781, and entering into the OBD diagnosis at S790.

Particularly, the reading of the D stage OBD diagnostic condition at S771 is performed in the following D stage OBD state of the vehicle direction reverse condition by the vehicle speed sensor, and the reading of the R stage OBD diagnostic condition at S781 is performed in the following R stage OBD state of the vehicle direction forward condition by the vehicle speed sensor.

D stage OBD state of the vehicle direction reverse condition by the vehicle speed sensor: A2 (set value 2)>V & reverse vehicle direction & downhill R stage OBD state of the vehicle direction forward condition by the vehicle speed sensor: A2 (set value 2)>V & forward vehicle direction & uphill Accordingly, the entering into the OBD diagnosis at S790 is performed by setting, as one entry condition, a case where for the current state of the vehicle 100, the ramp skid upper limit vehicle speed threshold (A2) is greater than the current detection speed value (V), and at the same time, the shift stage is a D location or the vehicle direction confirmed by the vehicle speed sensor is reverse on the downhill. In addition, the entering into the OBD diagnosis at S790 is performed by setting, as another entry condition, a case where for the current state of the vehicle 100, the ramp skid upper limit vehicle speed threshold (A2) is greater than the current detection speed value (V), and at the same time, the shift stage is an R location or the vehicle direction confirmed by the vehicle speed sensor is forward on the uphill.

Table 2 below shows an example representing the relationship between the OBD diagnosis and the engine stall with the idle torque compensation entry determination logic matrix in the idle torque compensation control (S70).

TABLE 2

Example of the idle torque compensation

| | ITEMS | Case #1 | Case #2 | Case #3 | Case #4 |
|---|---|---|---|---|---|
| INPUT DATA | Input shift stage | D | D | R | R |
| | Vehicle speed | Set value 2 > &reverse | Set value 2 > &reverse | Set value 2 > &forwatd | Set value 2 > &forwatd |
| | Slope | Downhill | Uphill | Downhill | Uphill |
| OUTPUT DATA | Determination | OBD | Intervention | Intervention | OBD |
| | Post-process | Maintain D stage | Diagnose Stall and then compensate D stage torque when not diagnosing Stall | Diagnose Stall and then compensate R stage torque when not diagnosing Stall | Enter into OBD diagnosis |

NOTES:
forwards of Cases #1, 3, 4 mean forwards of the vehicle direction and reverse of Case #2 means reverse of the vehicle direction Table 3 below shows an example representing the determining of the engine stall (S720) as an anti-knock logic matrix. In this case, the stall includes a PT stall (or a transmission stall). The PT stall (or the transmission stall) means that the power of the engine is input to a torque converter and the engine is rotated but the RPM of a turbine is zero or all conditions corresponding thereto.

TABLE 3

Example of the engine stall

| | ITEMS | Case #1 | Case #2 | Case #3 |
|---|---|---|---|---|
| Input data | Torque weight value | Margin | Margin | No margin (Max) |
| | Torque Reserve Margin | Irrelevance | Irrelevance | 0 |
| | Knocking sensing | No occurrence | Occurrence | Occurrence |
| Output | Determination | No Stall | Engine Stall | Engine Stall |
| | Post-process | Additionally increase torque according to Torque increase mapping | Enter into forced PT protection mode → if not, send warning message and turn off engine | Biter into forced PT protection mode → if not, send warning message and turn off engine |

| Case #4 | Case #5 | Case #6 | Remark |
|---|---|---|---|
| No margin (Max) | No margin (Max) | No margin (Max) | — |
| X | O | X | Basic Torque Reserve Mapping value criteria |
| Occurrence | No occurrence | No occurrence | Basic Knocking sensing Logic value |
| Engine Stall | No Stall | No Stall | |
| Enter into forced PT protection mode → if not, send warning message and turn off engine | Additionally increase torque according to Torque increase mapping | Forced PT protection mode | |

Particularly, the engine stall determination logic matrix represents that the determination criteria for the possible torque increase is determined by an increase in the torque based on an engine basic torque reserve mapping value. In addition, the engine stall determination logic matrix means that the engine stall determination basically follows the engine basic Knock sensing determination criteria, and if there is no torque increase margin even if there is no Knock, the anti-skid logic process in the method for reinforcing the safety of the vehicle on the ramp is stopped to enter into a forced PT protection mode (forcibly shifting to a neutral stage and returning to an idle), thereby providing to the user that the priority is to secure the braking force of the vehicle 100.

Referring back to FIGS. 1 to 3, the controller 10 enters into the third priority anti-skid countermeasures (S60, S90, S40-3) in the dissatisfaction of the primary vehicle speed condition (S60) of the second priority anti-skid countermeasures (S33, S60, S70, S80, S82, S83, S84, S84-2) or the torque non-intervention condition (S90), and the generating of the caution message (for example, the third driver warning message) (S40-3) is performed. In this case, the generating of the caution message (for example, the third driver warning message) (S40-3) will be described in detail with reference to FIGS. 7A and 7B.

Subsequently, the controller 10 enters into the fourth priority anti-skid countermeasures (S92, S93, S94, S95, S97, S98, S100, S110, S111, S120, S130) after the generating of the caution message (for example, the third driver warning message) at S40-3.

Further referring to FIGS. 1 to 3, the controller 10 finally performs the fourth priority anti-skid countermeasures (S92, S93, S94, S95, S97, S98, S100, S110, S111, S120, S130). In this case, the fourth priority anti-skid countermeasures (S92, S93, S94, S95, S97, S98, S100, S110, S111, S120, S130) confirm the PT protection necessity in the second vehicle speed condition (S93) and then perform the confirming of the after-startup ramp anti-skid necessity (for example, the after-secondary-startup ramp anti-skid necessity) (S100) in the state where the PT non-intervention condition (S98) is established, and according to the result thereof, is switched to the first priority anti-skid countermeasures (S30-2, S40-1, S50, S50-1) through the generating the notification message at S40-1 in the ramp first management condition at S110 or perform the PT protection (for example, the forced N stage) at S95 in the ramp second management condition at S111 again or perform the permitting of the shift and erasing the data at S130 in the not applying of the ramp management condition at S120.

Specifically, the fourth priority anti-skid countermeasures (S92, S93, S94, S95, S97, S98, S100, S110, S111, S120, S130) include confirming whether to satisfy the secondary vehicle speed condition at S92, confirming the PT protection necessity at S93, entering into the PT intervention condition at S94, protecting the PT (for example, forced N stage) at S95 in the dissatisfaction of the secondary vehicle speed condition at S92 or the PT intervention condition at S94, the generating of the warning message (for example, a fourth driver warning message) at S40-4, reading the vehicle gradient calculation value (for example, a tertiary vehicle gradient calculation value) at S97, and returning to the confirming of the PT protection necessity at S93. In this case, the generating of the warning message (for example, the fourth driver warning message) at S40-4 will be described in detail with reference to FIGS. 9A and 9B.

As an example, the confirming whether to satisfy the secondary vehicle speed condition at S92 applies the following second vehicle skid determination formula.

Second vehicle skid determination formula: V>A3

In the second vehicle skid determination formula, "V" refers to the current detection speed value of the vehicle 100, "A3" refers to a set value 3 of the ramp skid maximum vehicle speed threshold, and refers to the vehicle skid possibility in the road gradient (K) condition of the ramp 200 and ">" refers to an inequality sign indicating the size relationship between two values. Accordingly, the ramp skid maximum vehicle speed threshold (A3) varies depending on the weight of the vehicle and the size of the road gradient (K) like the ramp skid upper/lower limit vehicle speed thresholds (A2, A1) and thus is not limited to a specific value.

As a result, if the "current detection speed value (V)>ramp skid maximum vehicle speed threshold (A3)" is satisfied, the controller 10 enters into the performing the PT protection necessity at S93, whereas switching to the protecting the PT (for example, the forced N stage) at S95 if not satisfied.

As an example, the confirming of the PT protection necessity (S93) is performed by the determination of the vehicle driving state using the vehicle speed, the gradient calculation value by the road gradient (K), the shift stages P, N, D, R, the vehicle direction for each forward and reverse based on the vehicle speed sensor detected and confirmed by the vehicle speed sensor of the sensor unit 120, the occurrence of the stall (the engine or the transmission), and the like, which will be described by a PT protection necessity control (S930, S931, S932, S932-1, S933, S933-1, S934, S934-1, S934-2, S935, S935-1, S935-2, S936, S936-1, S937, S937-1, S938, S938-1, S939) illustrated in FIGS. 6A and 6B.

Figure 8A:
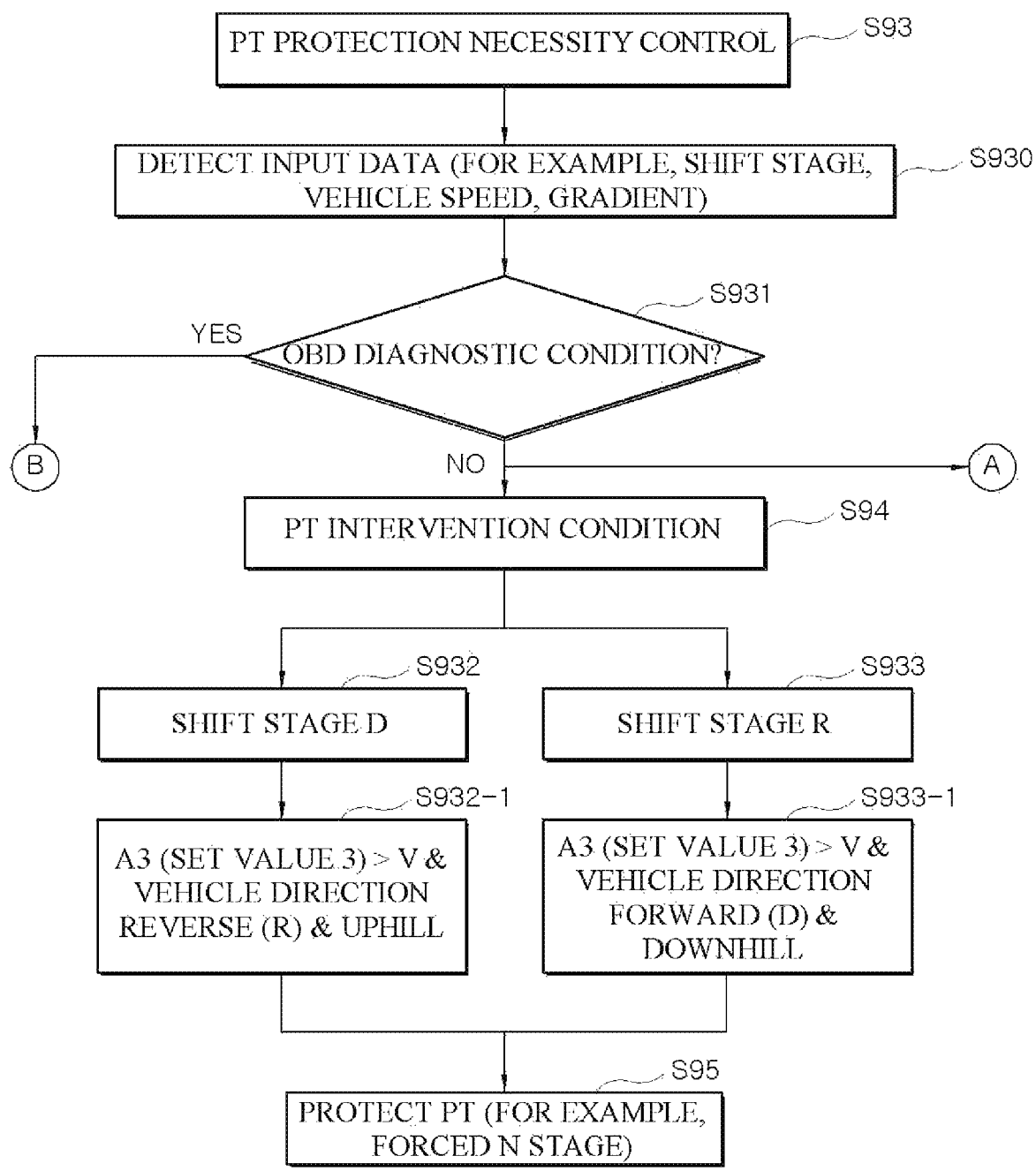
FIGS. 8A, 8B and 8C are a diagram illustrating an example of a PT-based protection necessity control in the method for reinforcing safety of the vehicle on the ramp according to the present disclosure.
Figure 8B:
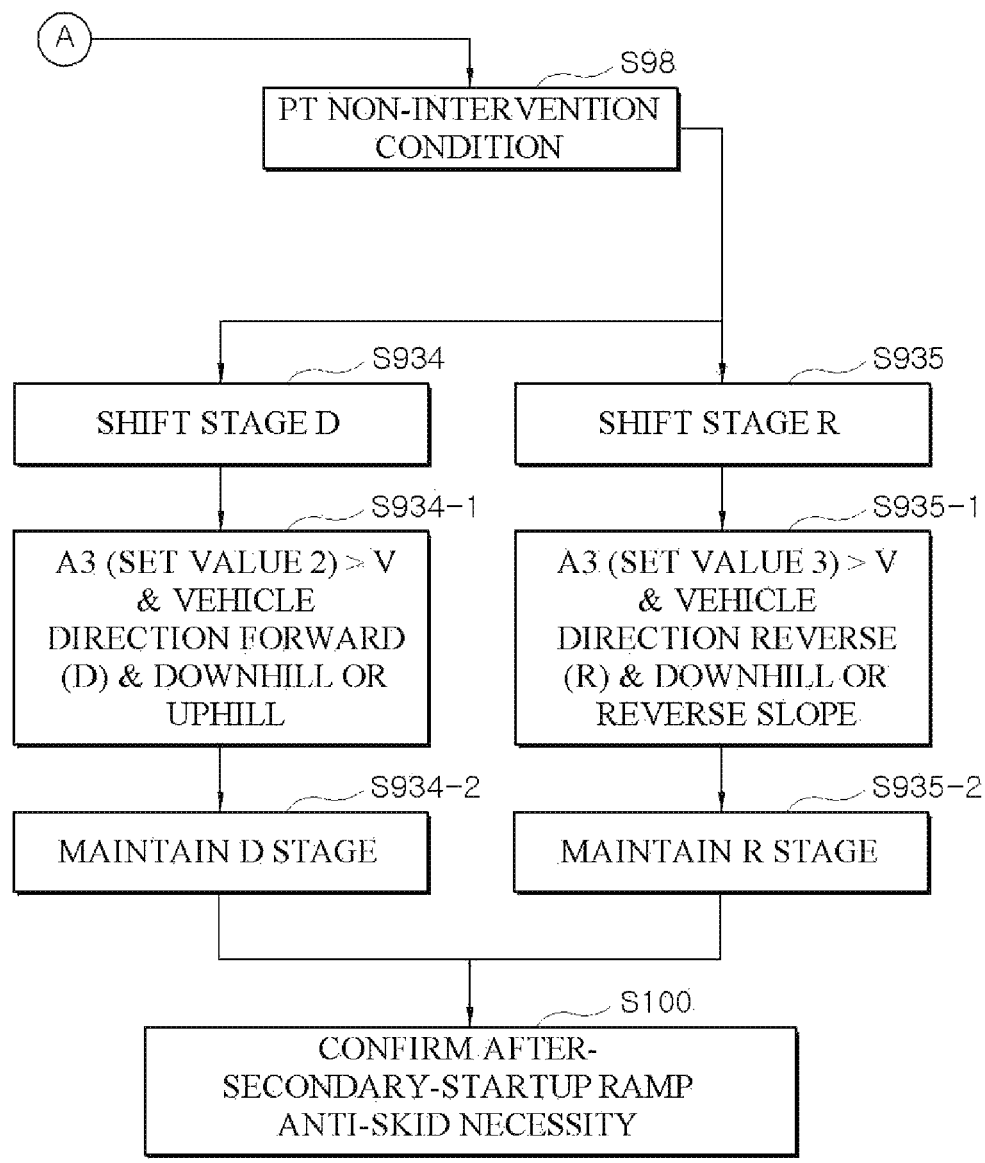
Figure 8C:
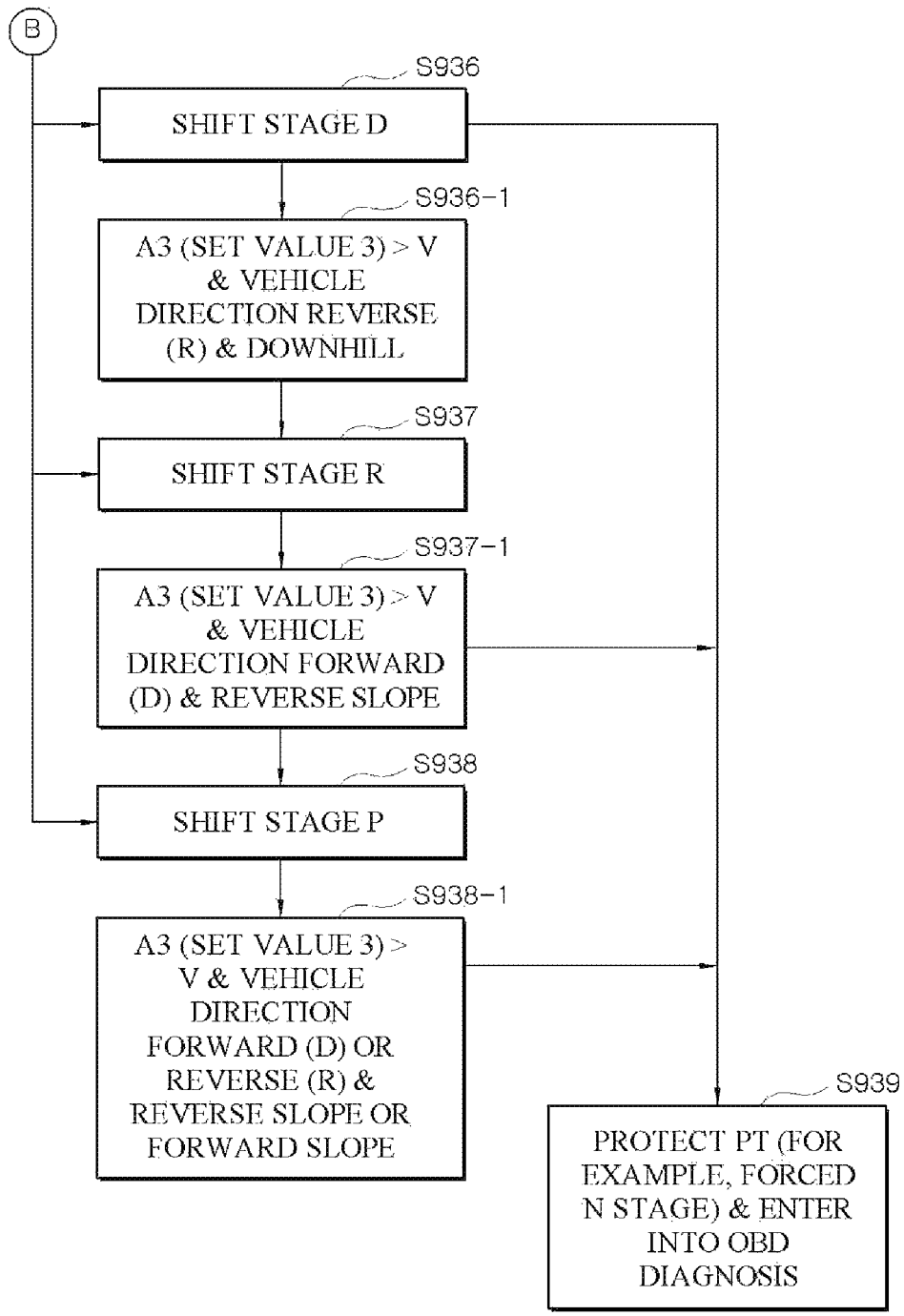

FIGS. 8A, 8B and 8C illustrate the PT protection necessity control (S930, S931, S932, S932-1, S933, S933-1, S934, S934-1, S934-2, S935, S935-1, S935-2, S936, S936-1, S937, S937-1, S938, S938-1, S939) for the confirming of the PT protection necessity (S93).

First, the controller 10 detects the shift stage, the vehicle speed, the road gradient (K), or the vehicle gradient calculation value from the input data step (S930), enters into the confirming of the OBD diagnostic condition (S931), and performs forcibly shifting to the neutral stage (S94, S932, S932-1, S933, S933-1) if the OBD diagnosis is not needed or perform maintaining the shift (S98, S934, S934-1, S934-2, S935, S935-1, S935-2) whereas performing classifying the OBD diagnosis based on the forcibly shifting to the neutral stage (S936, S936-1, S937, S937-1, S938, S938-1, S939) if the OBD diagnosis is needed.

Subsequently, the controller 10 performs the forcibly shifting to the neutral stage (S94, S932, S932-1, S933, S933-1) with reading the shift stage D at S932 and entering into the D stage forced neutral condition at S932-1, and the forcibly shifting to the neutral stage (S94, S932, S932-1, S933, S933-1) or with reading the shift stage R at S933 and entering into the R stage forced neutral condition at S933-1 in the PT intervention condition at S94.

Particularly, the entering into the D stage forced neutral condition at S932-1 is performed in the following vehicle condition of the shift stage D of the vehicle direction reverse by the vehicle speed sensor, and the entering into the R stage forced neutral condition at S933-1 is performed in the following vehicle condition of the shift stage R of the vehicle direction forward by the vehicle speed sensor.

Vehicle condition of the shift stage D of the vehicle direction reverse by the vehicle speed sensor: A3 (set value 3)>V & reverse vehicle direction & uphill Vehicle condition of the shift stage R of the vehicle direction forward by the vehicle speed sensor: A3 (set value 3)>V & forward vehicle direction & downhill In the vehicle condition of the shift stage formulas above, "V" refers to the current detection speed value of the vehicle 100, "A3" refers to the ramp skid maximum vehicle speed threshold, and "&" refers to the and condition.

As a result, the entering into the D stage forced neutral condition at S932-1 is performed when for the current state of the vehicle 100, the ramp skid maximum vehicle speed threshold (A3) is greater than the current detection speed value (V), and at the same time, the shift stage is a D location or the vehicle direction confirmed by the vehicle speed sensor is reverse on the uphill. On the other hand, the entering into the R stage forced neutral condition at S933-1 is performed when for the current state of the vehicle 100, the ramp skid maximum vehicle speed threshold (A3) is greater than the current detection speed value (V), and at the same time, the shift stage is an R location or the vehicle direction confirmed by the vehicle speed sensor is forward on the downhill.

Then, the entering into the D stage forced neutral condition at S932-1 and the entering into the R stage forced neutral condition at S933-1 lead to the PT protection (for example, the forced N stage) at S95.

On the other hand, the controller 10 performs the maintaining of the shift (S98, S934, S934-1, S934-2, S935, S935-1, S935-2) with reading the shift stage D at S934, reading a D stage maintenance condition at S934-1, and maintaining the D stage at S934-2 or performs the maintaining the shift (S98, S934, S934-1, S934-2, S935, S935-1, S935-2) with the reading of the shift stage R at S935, reading the R stage maintenance condition at S935-1 and maintaining the R stage shift at S935-2 in the PT non-intervention condition at S98.

Particularly, the maintaining of the D stage shift at S934-2 is performed in the following vehicle condition of the shift stage D of the vehicle direction forward by the vehicle speed sensor, and the maintaining of the R stage shift at S935-2 is performed in the following vehicle condition of the shift stage R of the vehicle direction reserve by the vehicle speed sensor.

Vehicle condition of the shift stage D of the vehicle direction forward by the vehicle speed sensor: A3 (set value 3)>V & forward vehicle direction & downhill or uphill Vehicle condition of the shift stage R of the vehicle direction reverse by the vehicle speed sensor: A3 (set value 3)>V & reverse vehicle direction & downhill or uphill In the vehicle condition of the shift stage formulas above, "V" refers to the current detection speed value of the vehicle 100, "A3" refers to the ramp skid maximum vehicle speed threshold, and "&" refers to the and condition.

As a result, the maintaining of the D stage shift at S934-2 is performed when for the current state of the vehicle 100, the ramp skid maximum vehicle speed threshold (A3) is greater than the current detection speed value (V), and at the same time, the shift stage is a D location and the vehicle direction confirmed by the vehicle speed sensor is forward on the downhill or uphill. On the other hand, the maintaining of the R stage shift at S935-2 is performed when for the current state of the vehicle 100, the ramp skid maximum vehicle speed threshold (A3) is greater than the current detection speed value V, and at the same time, the shift stage is an R location and the vehicle direction confirmed by the vehicle speed sensor is reverse on the downhill or uphill.

Then, the maintaining of the D stage shift at S934-2 and the maintaining of the R stage shift at S935-2 lead to the confirming of the after-startup ramp anti-skid necessity (for example, the confirming of the after-secondary-startup ramp anti-skid necessity) at S100.

As an example, the classifying of the OBD diagnosis based on the forcibly shifting to the neutral stage (S936, S936-1, S937, S937-1, S938, S938-1, S939) includes reading the shift stage D at S936 and entering into the D stage OBD diagnostic condition at S936-1, or reading the shift stage R at S937 and entering into the R stage OBD diagnostic condition at S937-1, or reading the shift stage P at S938, entering into the P stage OBD diagnostic condition at S938-1, protecting the PT (for example, the forced N stage at S939), and entering into the OBD diagnosis.

Particularly, the entering into the D stage OBD diagnostic condition at S936-1 is performed in the following D stage OBD state of the vehicle direction reverse by the vehicle speed sensor, the entering into the R stage OBD diagnostic condition at S937-1 is performed in the following R stage OBD state of the vehicle direction forward by the vehicle speed sensor, and the entering into the P stage OBD diagnostic condition at S938-1 is performed in the following P stage OBD state of the vehicle direction forward or reverse by the vehicle speed sensor.

D stage OBD state of the vehicle direction reverse by the vehicle speed sensor: A3 (set value 3)>V & reverse vehicle direction & downhill R stage OBD state of the vehicle direction forward by the vehicle speed sensor: A3 (set value 3)>V & forward vehicle direction & uphill P stage OBD state of the vehicle direction forward or reverse by the vehicle speed sensor: A3 (set value 3)>V & forward vehicle direction or reverse vehicle direction & uphill, A3 (set value 3)>V & forward vehicle direction or reverse vehicle direction & downhill Accordingly, the entering into the D stage OBD diagnostic condition at S936-1 is performed when for the current state of the vehicle 100, the ramp skid maximum vehicle speed threshold (A3) is greater than the current detection speed value (V), and at the same time, the shift stage is a D location or the vehicle direction confirmed by the vehicle speed sensor is reverse on the downhill. In addition, the entering into the R stage OBD diagnostic condition at S937-1 is performed when for the current state of the vehicle 100, the ramp skid maximum vehicle speed threshold (A3) is greater than the current detection speed value (V), and at the same time, the shift stage is an R location or the vehicle direction confirmed by the vehicle speed sensor is forward on the uphill.

On the other hand, the entering into the P stage OBD diagnostic condition at S938-1 may be performed when for the current state of the vehicle 100, the ramp skid maximum vehicle speed threshold (A3) is greater than the current detection speed value (V), and at the same time, the shift stage is a P location or the vehicle direction confirmed by the vehicle speed sensor is reverse or forward on the uphill, and may be performed when for the current state of the vehicle 100, the ramp skid maximum vehicle speed threshold (A3) is greater than the current detection speed value (V), and at the same time, the shift stage is a P location or the vehicle direction confirmed by the vehicle speed sensor is reverse or forward on the downhill.

Table 4 below shows an example representing the PT protection necessity control at S93 as the PT protection logic intervention determination logic matrix.

TABLE 4

Example of the PT protection necessity

| | ITEMS | Case#1 | Case#2 | Case#3 | Case#4 |
|---|---|---|---|---|---|
| INPUT DATA | input shift stage | D | D | D | D |
| | vehicle speed | set value3 > &forward | set value3 > &forward | set value3 > &reverse | set value3 > &reverse |
| OUTPUT DATA | slope determination | downhill non-intervention | uphill non-intervention | downhill OBD | uphill intervention |
| | post-process | maintain D stage | maintain D stage | forcibly enter into N stage, enter into OBD diagnosis | enter into PT protection logic |

| Case#5 | Case#6 | Case#7 | Case#8 | Case#9 | Case#10 | Case#11 | Case#12 |
|---|---|---|---|---|---|---|---|
| R | R | R | R | P | P | P | P |
| set value3> &forward downhill | set value3 > &forward uphill | set value3 > &reverse downhill | set value3 > &reverse uphill | set value 3 > &forward downhill | set value 3 > &forward uphill | set value3 > &reverse downhill | set value3 > &reverse uphill |
| intervention | OBD | non-intervention | non-intervention | OBD | OBD | OBD | OBD |
| enter protection logic | forcibly enter into N stage, enter into OBD diagnosis | maintain R stage | maintain R stage | forcibly enter into N stage, enter into OBD diagnosis | forcibly enter into N stage, enter into OBD diagnosis | forcibly enter into N stage, enter into OBD diagnosis | forcibly enter into N stage, enter into OBD diagnosis |

NOTES: the forwards of Cases #1, 2, 5, 6, 9, 10 mean the vehicle direction forward, and the reverses of Cases #3, 4, 7, 8, 11, 12 mean the vehicle direction reverses, respectively Furthermore, the fourth priority anti-skid countermeasures (S92, S93, S94, S95, S97, S98, S100, S110, S111, S120, S130) perform the entering into the PT non-intervention condition (S98) by not confirming the PT protection necessity (S93), and confirming the after-startup ramp anti-skid necessity (for example, confirming of the after-secondary-startup ramp anti-skid necessity) by confirming the vehicle speed, the proceeding direction, and the shift stages P, N, D, R in the state where the PT non-intervention condition (S98) is established (S100).

Then, the controller 10 classifies the ramp first and second management conditions (S110, S111) and the not applying the management condition (S120) in the confirming the after-startup ramp anti-skid necessity (for example, the after-secondary-startup ramp anti-skid necessity) at S100.

As a result, the controller 10 sets the ramp first management condition (S110) as the vehicle skid possibility state to switch to the first priority anti-skid countermeasures (S30-2, S40-1, S50, S50-1) through the generating of the notification message (S40-1) or sets the ramp second management condition (S111) as the vehicle skid possibility state to perform the protecting of the PT (for example, the forced N stage) (S95) again or sets the non-applying of the ramp management condition (S120) as a state of being irrelevant to the skid of the vehicle to perform the permitting the shift and erasing the data at S130).

Finally, the permitting the shift and erasing the data at S130) represents that the vehicle 100 has started safely and normally without skidding on the ramp 200 as illustrated in FIG. 4.

Figure 9A:
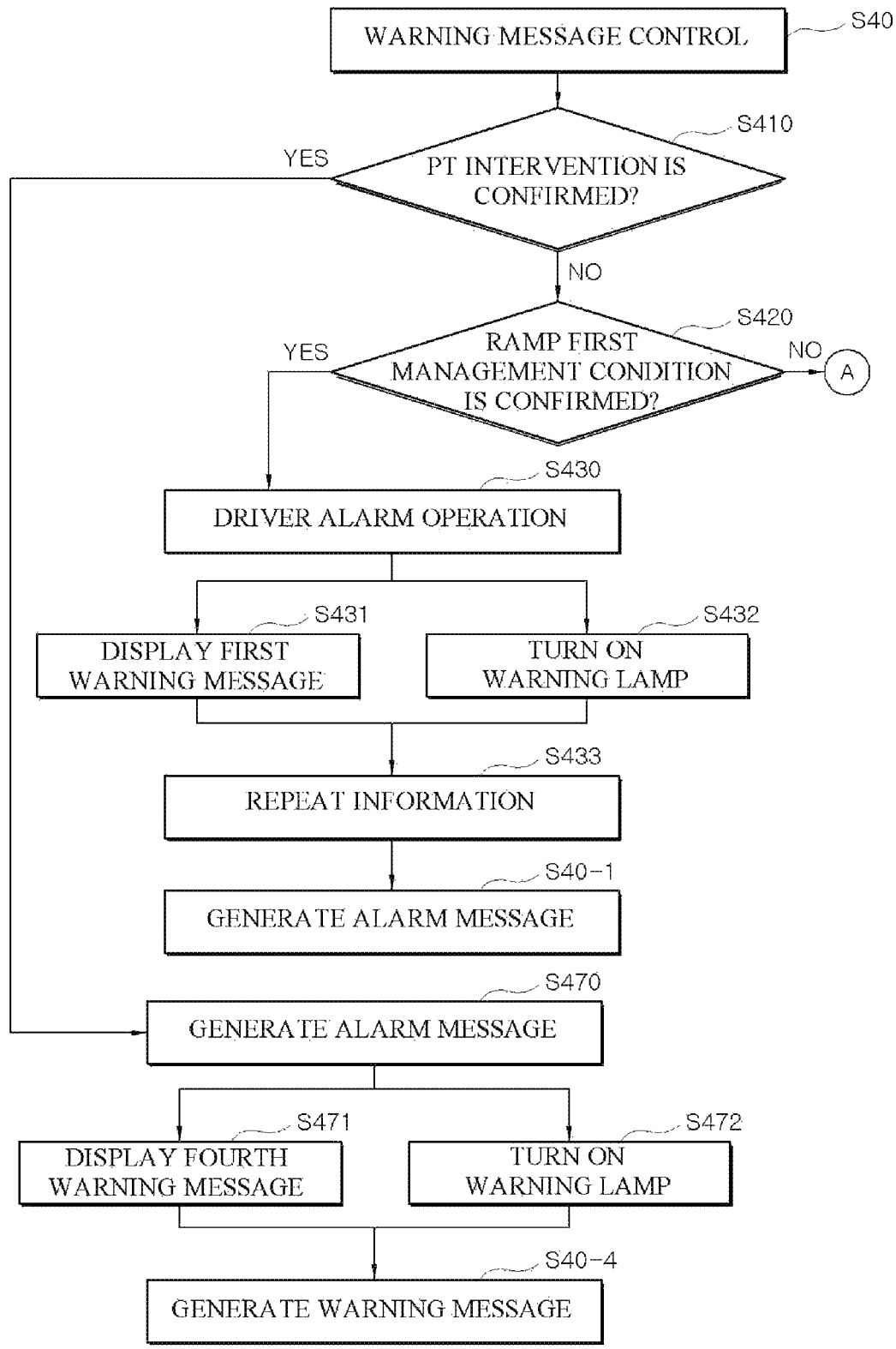
FIGS. 9A and 9B are a diagram illustrating an example of a warning message application control in the method for reinforcing safety of the vehicle on the ramp according to the present disclosure.
Figure 9B:
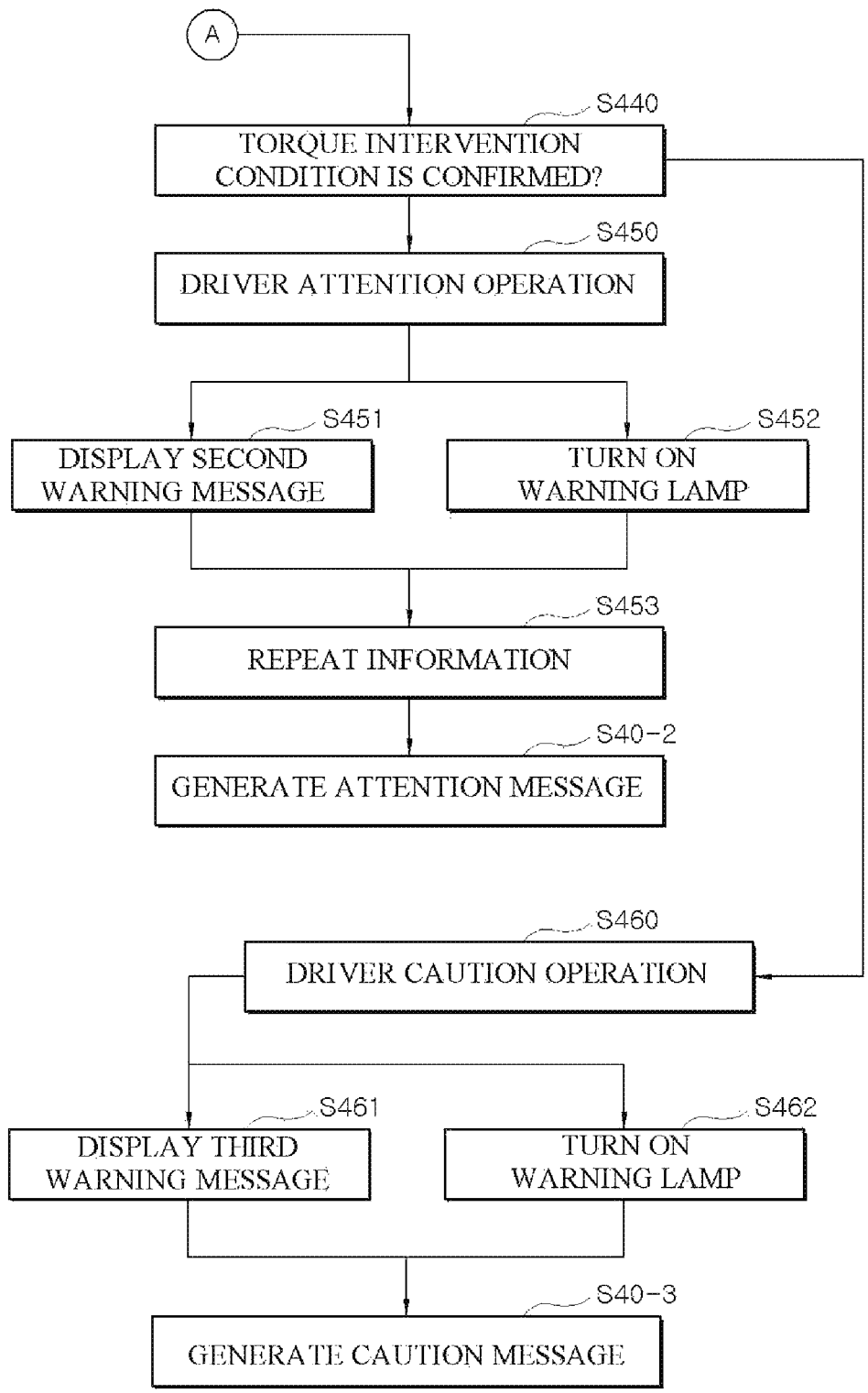

Meanwhile, FIGS. 9A and 8B illustrate the warning message control (S40) for notifying the driver of the vehicle skid on the ramp.

When confirming the PT intervention condition through the confirming of the PT intervention condition at S410), the controller 10 switches to an driver warning operation at S470), and leads to the generating of the warning message at S40-4) by displaying the fourth warning message at S471) and turning on the warning lamp at S472).

Subsequently, if the PT intervention condition is not confirmed through the confirming the PT intervention condition at S410, the controller 10 performs a driver notification operation at S430 through the confirming of the ramp first management condition at S420, or performs a driver attention operation at S450 through the confirming of the torque intervention condition at S440. On the other hand, when the ramp first management condition at S420 and the torque intervention condition at S440 are not confirmed, the controller 10 performs a driver caution operation at S460.

As an example, the driver notification operation at S430 leads to the generating the notification message at S40-1 through the displaying of the first warning message at S431 and the turning on of the warning lamp at S432. In this case, the generating of the notification message at S40-1 may maintain an information repetition state until a certain time or condition is resolved as in S433.

As an example, the driver attention operation at S450 leads to the generating of the attention message at S40-2 through the displaying of the second warning message at S451 and the turning on the warning lamp at S452. In this case, the generating of the attention message at S40-2 may maintain the information repetition state until a certain time or condition is resolved as in S453.

As an example, the driver caution operation at S460 leads to the generating of the caution message at S40-3 through the displaying of the third warning message at S461 and the turning on of the warning lamp at S462.

As described above, the warning message control at S40 may generate a driver warning rating classified into at least four levels for the skid of the vehicle 100 which starts on the ramp 200, thereby continuously causing the driver to call his/her attention to the skid situation countermeasure ability.

Referring to FIG. 4, each of the displaying of the first, second, third, and fourth warning messages (S431, S451, S461, S471) displays the warning message as a character or a symbol through the warning window 40 provided on the cluster forming the driver seat of the vehicle 100 so as to allow the driver to perform the skid countermeasure, and each of the turning on of the warning lamps (S432, S452, S462, S472) is provided with the warning lamp 50 provided on the cluster forming the driver seat of the vehicle 10 so as to cause the driver to call his/her attention to the surroundings. In this case, each of the turning on of the warning lamps (S432, S452, S462, S472) may be classified into first, second, third, and fourth driver warning levels to vary colors or the number of times turned on.

Table 5 below shows an example of classification and notification for each warning message skid case of the warning message control at S40.

Furthermore, the method for reinforcing the safety of the vehicle on the ramp includes the first priority anti-skid countermeasure control (S32, S40-1, S50, S50-1) in which the brake operation is performed together with the occurrence of the skid of the vehicle/the display of the vehicle stop message in the ramp first management condition (S32), the second priority anti-skid countermeasure control (S33, S60, S70, S80, S82, S83, S84, S84-2) in which the compensating of the idle torque is performed together with the guidance of the operation of the anti-skid function/the display of the vehicle stop message in the ramp second management condition (S33), the third priority anti-skid countermeasure control (S60, S90, S40-3) in which the turn-off/the display of the vehicle stop message is performed, and the fourth priority anti-skid countermeasure control (S92, S93, S94, S95, S97, S98, S100, S110, S111, S120, S130) in which the forcibly shifting to the N (neutral) stage or the permitting of the shift is performed together with the forcibly switching to the shift N stage/the display of the vehicle stop message.

Accordingly, the method for reinforcing the safety of the vehicle on the ramp does not require the EPB, and thus may protect the durability of the vehicle and secure the passen-

TABLE 5

Example of the warning message

Case #1: repeatedly notify information about the occurrence of the skid of the vehicle
ex) the skid of the vehicle has occurred.
Please depress the brake immediately to stop the vehicle.
Case #2: repeatedly notify the operation of the vehicle anti-skid function and the stop induction.
ex) the anti-skid function is operated because the skid of the vehicle occurs.
Please depress the brake immediately to stop the vehicle.
Case #3: notify the possiblities of the skid of the vehicle and the engine stop
ex) the engine may be turned off due to the occurrence of the skid of the vehicle.
Please depress the brake immediately to stop the vehicle.
Case #4:: notify vehicle skid N stage forced entry
ex) the gear was shifted to N stage due to the occurrence of the skid of the vehicle.
Please depress the brake immediately to stop the vehicle.

Accordingly, Case #1 describes the first priority anti-skid countermeasures (S32, S40-1, S50, S50-1) in which the generating of the notification message (S40-1) is performed according to the ramp first management condition (S32), Case #2 describes the second priority anti-skid countermeasures (S33, S60, S70, S80, S82, S83, S84, S84-2) in which the generating of the attention message (S40-2) is performed according to the torque intervention condition (S80), Case #3 describes the third priority anti-skid countermeasures (S60, S90, S40-3) in which the generating of the caution message (S40-3) is performed according to the torque non-intervention condition (S90), and Case #4 describes the fourth priority anti-skid countermeasures (S92, S93, S94, S95, S97, S98, S100, S110, S111, S120, S130) in which the generating of the warning message (S40-4) is performed according to the PT intervention condition (S94).

As described above, the method for reinforcing the safety of the vehicle on the ramp applied to the vehicle 100 according to the present exemplary embodiment confirms the vehicle gradient calculation value at S20 by the controller 10 when the vehicle starts at S10 and then classifies the not applying of the management condition at S31, the ramp first management condition at S32, and the ramp second management condition at S33 with one or more of the vehicle speed, the vehicle direction of forward/reverse detected and confirmed by the vehicle speed sensor of the sensor unit 120 and the shift stage.

ger's safety with the driver warning about the vehicle skid condition while increasing the substantial vehicle applicability.

While the present disclosure has been described with respect to the specific embodiments, it will be apparent to those skilled in the art that various changes and modifications may be made without departing from the spirit and scope of the present disclosure as defined in the following claims. Accordingly, it should be noted that such alternations or modifications fall within the claims of the present disclosure, and the scope of the present disclosure should be construed on the basis of the appended claims.

The invention claimed is:
1. A method for reinforcing safety of a vehicle on a ramp, the method comprising:
confirming a vehicle gradient calculation value when an engine of a vehicle starts by a controller;
confirming an after-startup gradient vehicle movement condition which classifies a shift stage N (neutral) stage or P (park) stage located independent of a vehicle direction based on a sensor at a predetermined vehicle speed as a ramp first management condition, and classifies a shift stage D (drive) stage or R (reverse) stage located opposite to the vehicle direction based on the sensor at a certain vehicle speed as a ramp second management condition; and an anti-skid countermeasure control which varies a driver's recognition for the skid of the vehicle by setting, as a message rating, any one of generating a notification message, generating an attention message, generating a caution message, and generating a warning message, and wherein the anti-skid countermeasure control further selects an operation of a brake of the vehicle, compensating an idle torque, and forcibly shifting to the N stage according to the message rating.

2. The method of claim 1, wherein the anti-skid countermeasure control comprises:
a first priority anti-skid countermeasure control in which the generating of the notification message is performed by displaying the occurrence of the skid of the vehicle or a vehicle stop message, and turning on a warning lamp in the ramp first management condition; and
inducing a driver to operate the brake so that the brake is operated after the notification message is generated.

3. The method of claim 2, wherein the first priority anti-skid countermeasure control comprises:
performing the generating of the notification message in the ramp first management condition;
confirming the operation of the brake with a brake pedal signal; and
terminating the generating of the notification message by operating the brake.

4. The method of claim 1, wherein the anti-skid countermeasure control comprises:
a second priority anti-skid countermeasure control in which a torque intervention condition of the idle torque by a primary vehicle speed condition is confirmed in the ramp second management condition;
wherein the generating of the attention message is performed through displaying the guidance of the anti-skid function operation/vehicle stop message and turning on the warning lamp; and
the generating of the attention message notifies the driver that the idle torque compensation is performed through the generating the attention message.

5. The method of claim 4, wherein the second priority anti-skid countermeasure control comprises:
confirming a detected vehicle speed as a primary vehicle speed condition by detecting a vehicle speed;
performing an idle torque compensation control with one or more of the vehicle speed, a gradient, a shift stage, the vehicle direction based on the sensor, and an engine stall;
performing the generating of the attention message;
confirming a vehicle gradient calculation value again; and
performing the confirming of the after-startup ramp vehicle movement condition again when the vehicle speed reaches a target vehicle speed by the driving of the vehicle or switching to the forcibly shifting to the N stage when not reaching the target vehicle speed.

6. The method of claim 5, wherein the idle torque compensation control comprises:
confirming idle torque compensation necessity which classifies a torque intervention condition and a torque non-intervention condition with one or more of the vehicle speed, the gradient, and the shift stage;
determining the necessity for an OBD diagnostic condition in the torque intervention condition;
compensating the shift stage-based torque after confirming the non-occurrence of the engine stall when an OBD diagnosis is not needed; and
compensating the idle torque.

7. The method of claim 6, wherein the compensating of the shift stage-based torque comprises:
applying, to the compensating the idle torque, compensating a D stage torque which is performed when for a state of the vehicle, a vehicle speed is smaller than a ramp skid upper limit vehicle speed threshold, and a shift stage is a D location or the vehicle direction based on a vehicle speed sensor is reverse on an uphill; and
applying, to the compensating the idle torque, compensating an R stage torque which is performed when for the state of the vehicle, the vehicle speed is smaller than the ramp skid upper limit vehicle speed threshold, and at the same time, the shift stage is an R location or the vehicle direction based on the vehicle speed sensor is forward on a downhill.

8. The method of claim 6, wherein the shift stage-based OBD diagnostic control is performed when the OBD diagnosis is needed in the OBD diagnostic condition, and wherein the shift stage-based OBD diagnostic control comprises:
confirming the state of the vehicle that a vehicle speed is smaller than a ramp skid upper limit vehicle speed threshold, and a shift stage is a D location or the vehicle direction based on a vehicle speed sensor is reverse on a downhill;
confirming the state of the vehicle that the vehicle speed is smaller than the ramp skid upper limit vehicle speed threshold, and the shift stage is an R location or the vehicle direction based on the vehicle speed sensor is forward on a downhill on an uphill; and
entering into the OBD diagnosis.

9. The method of claim 1, wherein the anti-skid countermeasure control comprises:
a third priority anti-skid countermeasure control which performs the generating of the caution message through displaying turn-off or a vehicle stop message, and turning on a warning lamp when it is not the primary vehicle speed condition or the torque intervention condition.

10. The method of claim 1, wherein the anti-skid countermeasure control comprises:
a fourth priority anti-skid countermeasure control which performs the generating of the warning message through displaying forcibly shifting to a shift stage N stage/vehicle stop message and turning on a warning lamp, in a powertrain (PT) intervention condition of the powertrain (PT) by a secondary vehicle speed condition, and
notifies the driver that the forcibly shifting to the neutral stage is performed by the generating of the warning message.

11. The method of claim 10, wherein the fourth priority anti-skid countermeasure control comprises:
confirming a detected vehicle speed as the secondary vehicle speed condition by detecting a vehicle speed;
performing a powertrain (PT) protection control with one or more of the vehicle speed, a gradient, a shift stage, and the vehicle direction based on the vehicle speed sensor;
performing the generating of the warning message;
confirming a vehicle gradient calculation value again;
confirming not applying of the management condition while confirming the ramp first management condition and the ramp second management condition again through the confirming the after-startup ramp vehicle movement condition again in the powertrain (PT) non-intervention condition of the powertrain by the secondary vehicle speed condition; and switching to the generating of the notification message in the ramp first management condition or returning to the powertrain (PT) protection control in the ramp second management condition or erasing generated data together with permitting a shift in the not applying of the management condition.

12. The method of claim 11, wherein the powertrain (PT) protection control comprises:

determining necessity for the OBD diagnostic condition;

classifying the powertrain (PT) non-intervention condition together with the powertrain (PT) intervention condition with one or more of the vehicle speed, the gradient, and the shift stage when the OBD diagnosis is not needed in the OBD diagnostic condition;

forcibly shifting to a neutral with the forcibly shifting to the N stage for protecting the powertrain (PT) in the powertrain (PT) intervention condition;

maintaining the shift for a current shift stage in the powertrain (PT) non-intervention condition; and performing an OBD diagnosis based on the forcibly shifting to the neutral when the OBD diagnosis is needed in the OBD diagnostic condition.

13. The method of claim 12, wherein the forcibly shifting to the neutral comprises:

forcibly shifting to the N stage when for the state of the vehicle, a vehicle speed is smaller than a ramp skid maximum vehicle speed threshold, and a shift stage is a D location or the vehicle direction based on the vehicle speed sensor is reverse on an uphill; and forcibly shifting to the N stage when for the state of the vehicle, the vehicle speed is smaller than the ramp skid maximum vehicle speed threshold, and the shift stage is an R location or the vehicle direction based on the vehicle speed sensor is forward on a downhill.

14. The method of claim 12, wherein the maintaining the shift comprises:

maintaining a D stage as a current shift stage when for the state of the vehicle, a vehicle speed is smaller than a ramp skid maximum vehicle speed threshold, and at the same time, a shift stage is a D location or the vehicle direction based on the vehicle speed sensor is forward on a downhill or an uphill; and maintaining an R stage as the current shift stage when for the state of the vehicle, the vehicle speed is smaller than the ramp skid maximum vehicle speed threshold, and the shift stage is an R location or the vehicle direction based on the vehicle speed sensor is reverse on the downhill or the uphill.

15. The method of claim 12, wherein the classifying of the OBD diagnosis based on the forcibly shifting to the neutral comprises:

confirming the state of the vehicle that a vehicle speed is smaller than a ramp skid maximum vehicle speed threshold, and a shift stage is a D location or the vehicle direction based on a vehicle speed sensor is reverse on a downhill;

confirming the state of the vehicle that the vehicle speed is smaller than the ramp skid maximum vehicle speed threshold, and the shift stage is an R location or the vehicle direction based on the vehicle speed sensor is forward on an uphill;

confirming the state of the vehicle that the vehicle speed is smaller than the ramp skid maximum vehicle speed threshold, and the shift stage is a P location or the vehicle direction based on the vehicle speed sensor is reverse or forward on the uphill, or the state of the vehicle that the vehicle speed is smaller than the ramp skid maximum vehicle speed threshold, and the shift stage is a P location or the vehicle direction based on the vehicle speed sensor is reverse or forward on the downhill; and entering into the OBD diagnosis after the forcibly shifting to the neutral.

16. The method of claim 1, wherein the vehicle gradient calculation value is obtained by a vehicle gradient calculation control, and wherein the vehicle gradient calculation control comprises:

confirming whether a brake pedal is operated after erasing an existing gradient storage value;

compensating a current road gradient based on vehicle deceleration if the brake pedal is operated;

compensating the current road gradient based on vehicle acceleration if the brake pedal is not operated; and determining the vehicle gradient calculation value through the compensating of the road gradient value by the current road gradient compensation calculation value based on the vehicle deceleration or the current road gradient compensation calculation value based on the vehicle acceleration.

17. The method of claim 16, wherein the compensating of the current road gradient based on the vehicle deceleration comprises:

estimating a vehicle braking force according to an operation of the brake pedal;

calculating a vehicle pitch slope of an accelerator sensor with a braking average deceleration; and calculating the current road gradient compensation with an acceleration sensor pitch and a pitch slope by the vehicle deceleration.

18. The method of claim 16, wherein the compensating of the current road gradient based on the vehicle acceleration comprises:

updating the vehicle speed per a set unit time by not operating the brake pedal;

calculating the vehicle acceleration with a change in the vehicle speed per the set unit time; and calculating the current road gradient compensation with an acceleration sensor pitch and a pitch slope by the vehicle acceleration.

19. The method of claim 1, wherein the confirming of the after-startup ramp vehicle movement condition is performed by an after-startup ramp anti-skid control, and wherein the after-startup ramp anti-skid control comprises:

detecting a shift stage at a vehicle speed which is greater than a ramp skid lower limit vehicle speed threshold;

generating, as a second output, an N stage or a P stage in a matching direction condition between the shift stage and the vehicle speed direction so as to be applied to the ramp first management condition or generating, as the second output, a D stage or an R stage in the opposite direction between the shift stage and the vehicle speed direction after the confirming of the OBD diagnostic record is performed so as to be applied to the ramp second management condition; and generating, as a first output, the D stage or the R stage when the vehicle speed is smaller than the ramp skid lower limit vehicle speed threshold or in the matching direction condition between the shift stage and the vehicle speed direction so as to be not applied to the management condition.

20. A vehicle comprising:
- a controller which performs any one of a first priority anti-skid countermeasure control in which a brake is operated together with displaying an occurrence of the skid of a vehicle/vehicle stop message when a vehicle starts on a ramp which results in the occurrence of the skid of the vehicle, a second priority anti-skid countermeasure control in which compensating an idle torque is performed together with displaying a guidance of anti-skid function operation or vehicle stop message, a third priority anti-skid countermeasure control in which displaying a turn-off or vehicle stop message is performed, and a fourth priority anti-skid countermeasure control in which forcibly shifting to a N (Neutral) stage or permitting the shift together with displaying a forcibly switching to the shift stage N stage or vehicle stop message is performed;
- a warning window which displays a message on a vehicle cluster under a control of the controller; and
- a warning lamp which is turned on the vehicle cluster under the control of the controller.

* * * * *